(12) United States Patent
Yang et al.

(10) Patent No.: US 12,524,207 B2
(45) Date of Patent: Jan. 13, 2026

(54) CHARGE-DOMAIN IN-MEMORY COMPUTING CIRCUIT

(71) Applicant: William Marsh Rice University, Houston, TX (US)

(72) Inventors: Kaiyuan Yang, Houston, TX (US); Zhiyu Chen, Houston, TX (US)

(73) Assignee: William Marsh Rice University, Houston, TX (US)

( * ) Notice: Subject to any disclaimer, the term of this patent is extended or adjusted under 35 U.S.C. 154(b) by 259 days.

(21) Appl. No.: 17/761,116

(22) PCT Filed: Mar. 11, 2022

(86) PCT No.: PCT/US2022/020055
§ 371 (c)(1),
(2) Date: Mar. 16, 2022

(87) PCT Pub. No.: WO2022/192744
PCT Pub. Date: Sep. 15, 2022

(65) Prior Publication Data
US 2024/0045655 A1 Feb. 8, 2024

Related U.S. Application Data

(60) Provisional application No. 63/160,572, filed on Mar. 12, 2021.

(51) Int. Cl.
*G06F 7/544* (2006.01)
*G06F 15/78* (2006.01)
*G11C 11/412* (2006.01)

(52) U.S. Cl.
CPC ........ *G06F 7/5443* (2013.01); *G06F 15/7821* (2013.01); *G11C 11/412* (2013.01)

(58) Field of Classification Search
CPC .............. G06F 7/5443; G06F 15/7821; G06F 2207/4814; G11C 11/412; G11C 11/419
See application file for complete search history.

(56) References Cited

U.S. PATENT DOCUMENTS 10,332,590 B2   6/2019  Li et al.
2019/0042160 A1* 2/2019  Kumar .................. G06F 3/0659
(Continued)

OTHER PUBLICATIONS

Su et al.; "A 28nm 384kb 6T-SRAM Computation-in-Memory Macro with 8b Precision for AI Edge Chips;" 2021 IEEE International Solid-State Circuits Conference; Feb. 17, 2021 (3 pages).
(Continued)

*Primary Examiner* — Matthew D Sandifer
(74) *Attorney, Agent, or Firm* — Osha Bergman Watanabe & Burton LLP

(57) ABSTRACT

A charge-domain IMC circuit is disclosed and includes: a cluster of 6T SRAM cells; a charge-domain MAC circuit; and an LBL connected to a bit-line of each of the 6T SRAM cells. The MAC circuit includes: a MOS transistor; an input switch; an output switch; an input port; an output port; and a capacitor. The LBL is connected to a gate of the MOS transistor. A first terminal of the MOS transistor is connected to a DC voltage, and a second terminal of the MOS transistor is connected to the output port via the output switch. The second terminal of the MOS transistor is connected to the input port via the input switch and to a first side of the capacitor. A second side of the capacitor is grounded. Other variants of the IMC circuit are disclosed, some of which having a ciSAR ADC or a TD-ADC.

19 Claims, 24 Drawing Sheets

(56) References Cited

U.S. PATENT DOCUMENTS

| | | | |
|---|---|---|---|
| 2019/0043560 A1* | 2/2019 | Sumbul | G06N 3/08 |
| 2021/0192324 A1* | 6/2021 | Srivastava | G06N 3/063 |
| 2023/0074229 A1* | 3/2023 | Jia | G06F 15/7821 |
| 2023/0161627 A1* | 5/2023 | Zhang | G06F 9/5027 |
| | | | 712/220 |

OTHER PUBLICATIONS

Zhang et al.; "In-Memory Computation of a Machine-Learning Classifier in a Standard 6T SRAM Array;" IEEE Journal of Solid-State Circuits, vol. 52, No. 4; Apr. 2017 (10 pages).
Chiu et al.; "A 4-Kb 1-to-8-bit Configurable 6T SRAM-Based Computation-in-Memory Unit-Macro for CNN-Based AI Edge Processors;" IEEE Journal of Solid-State Circuits, vol. 55, No. 10; Oct. 2020 (12 pages).
International Search Report issued in International Application No. PCT/US2022/020055 dated Aug. 29, 2022 (6 pages).
Written Opinion issued in International Application No. PCT/US2022/020055 dated Aug. 29, 2022 (8 pages).
Lee, Edward H. et al. "Analysis and Design of a Passive Switched-Capacitor Matrix Multiplier for Approximate Computing" arxiv.org, Cornell University Library, 201 Olin Library Cornell University Ithaca, NY 14853, Dec. 3, 2016 (34 pages).
Chen, Zhiyu et al. "CAP-RAM: A Charge-Domain In-Memory Computing 6T-SRAM for Accurate and Precision-Programmable CNN Inference" arxiv.org, Cornell University Library, 201 Olin Library Cornell University Ithaca, NY 14853, Jul. 6, 2021 (12 pages).

* cited by examiner

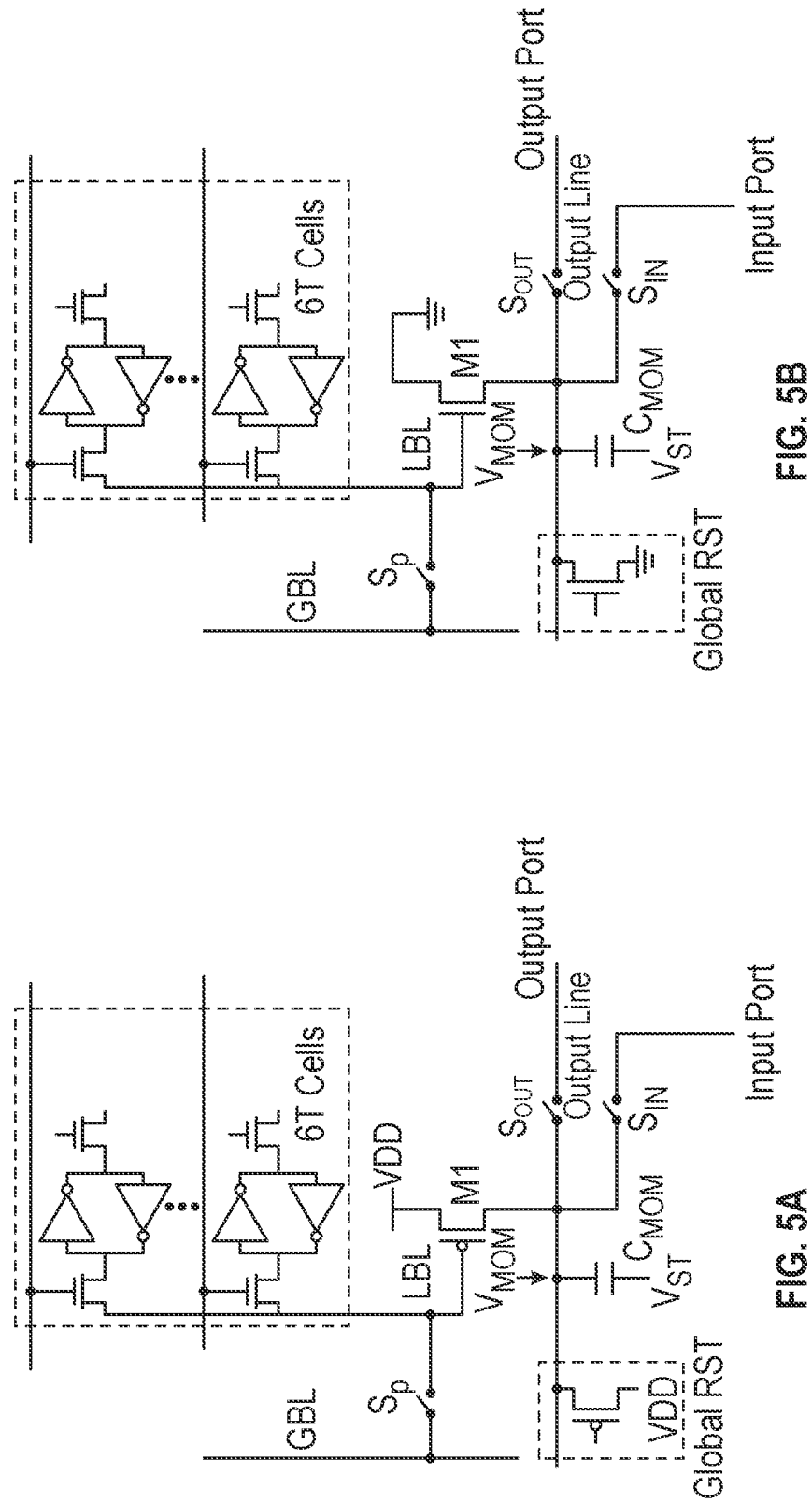

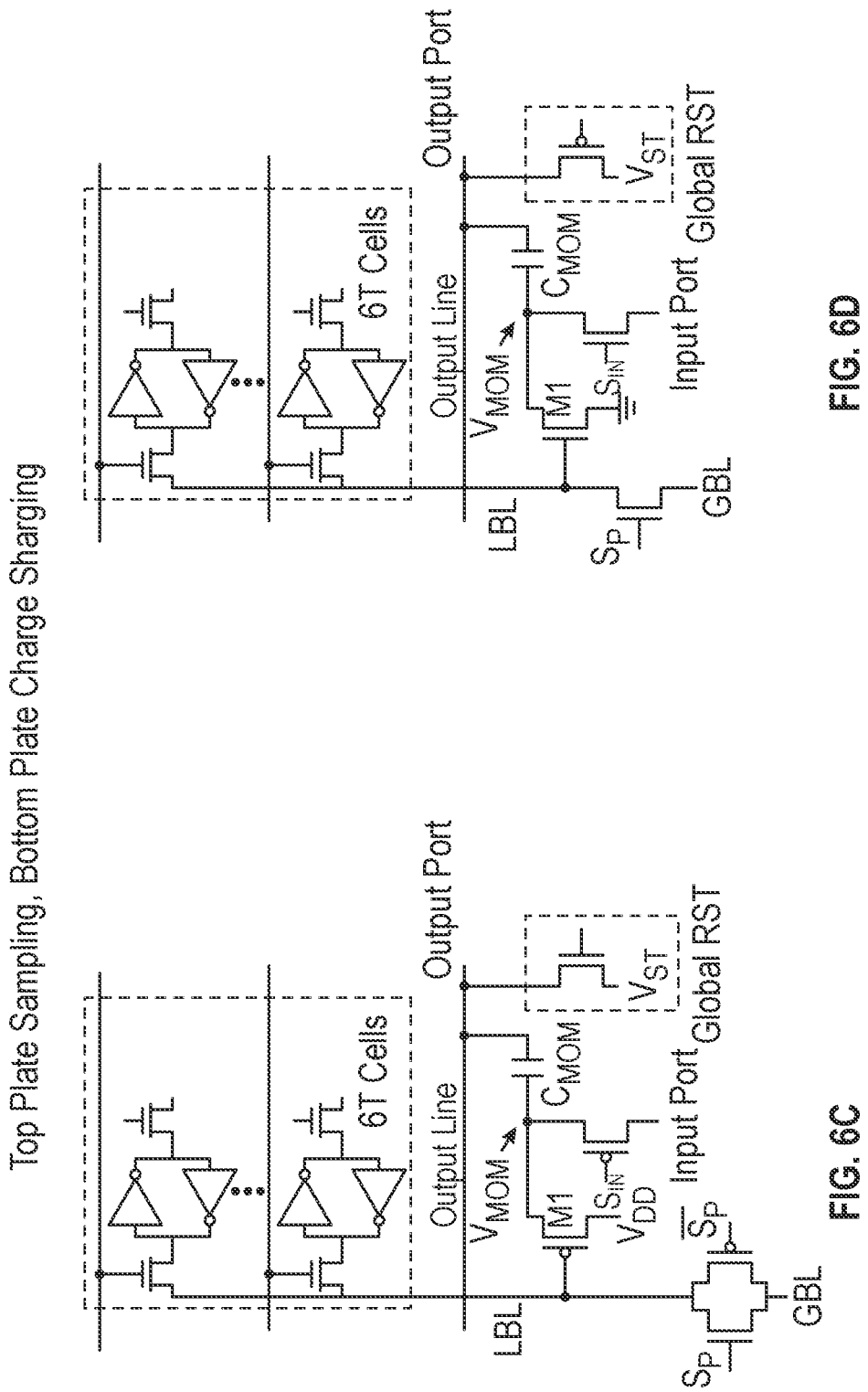

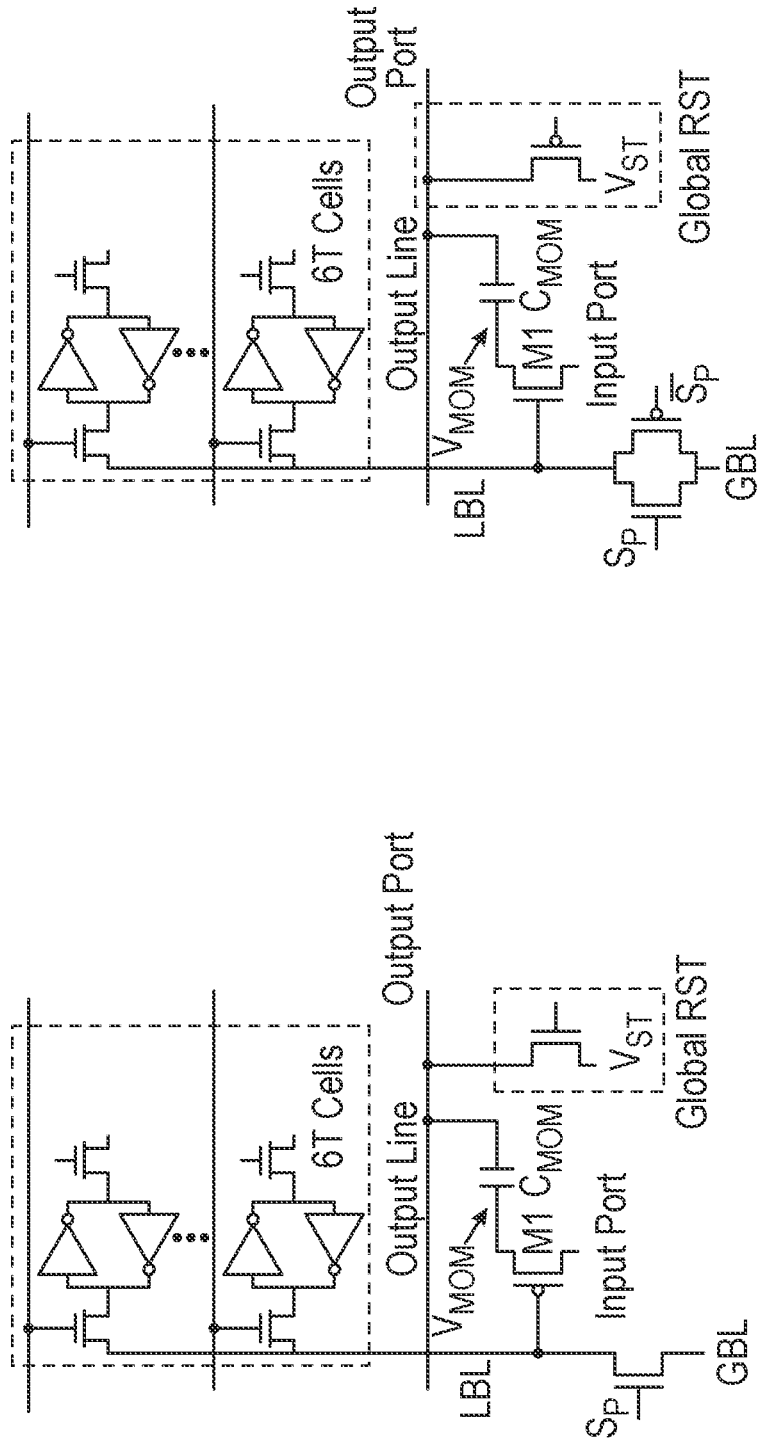

CHARGE-DOMAIN IN-MEMORY COMPUTING CIRCUIT

BACKGROUND

Deep convolutional neural networks (CNNs) are widely used in artificial intelligence (AI) applications. To implement a CNN, in-memory computing (IMC) circuits are commonly used. An IMC typically has one or more standard memory cells, such as static random-access memory (SRAM) cells, accompanied by computing circuitry. One of the IMC techniques is charge-domain IMC, where analog multiplication is performed on local capacitors and accumulation is performed by charge sharing among local capacitors.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, this disclosure relates to charge-domain IMC circuit that includes: a cluster of a plurality of six-transistor (6T) SRAM cells; a charge-domain multiply-and-accumulate computing (MAC) (MAC) circuit; and a local bit-line (LBL). The LBL is connected to a bit-line of each of the 6T SRAM cells. The MAC circuit includes: a metal-oxide-semiconductor (MOS) transistor; an input switch; an output switch; an input port; an output port; and a capacitor. The LBL is connected to a gate of the MOS transistor. A first terminal of the MOS transistor is connected to a DC voltage, and a second terminal of the MOS transistor is connected to the output port via the output switch. The second terminal of the MOS transistor is connected to the input port via the input switch. The second terminal of the MOS transistor is connected to a first side of the capacitor. A second side of the capacitor is grounded.

In one aspect, this disclosure relates to charge-domain IMC circuit that includes: a cluster of a plurality of 6T SRAM cells; a charge-domain MAC circuit; and an LBL. The LBL is connected to a bit-line of each of the 6T SRAM cells. The MAC circuit includes: a MOS transistor; an input switch; an input port; an output port; and a capacitor. The LBL is connected to a gate of the MOS transistor. A first terminal of the MOS transistor is connected to a DC voltage, and a second terminal of the MOS transistor is connected to a first side of the capacitor. The second terminal of the MOS transistor is connected to the input port via the input switch. A second side of the capacitor is connected to the output port.

In one aspect, this disclosure relates to charge-domain IMC circuit that includes: a cluster of a plurality of 6T SRAM cells; a charge-domain MAC circuit; and an LBL. The LBL is connected to a bit-line of each of the 6T SRAM cells. The MAC circuit includes: a MOS transistor; an input port; an output port; and a capacitor. The LBL is connected to a gate of the MOS transistor. A first terminal of the MOS transistor is connected to the input port, and a second terminal of the MOS transistor is connected to a first side of the capacitor. A second side of the capacitor is connected to the output port.

In one aspect, this disclosure relates to charge-domain IMC circuit that includes: a cluster of a plurality of 6T SRAM cells; a charge-domain MAC circuit; a bit-line connecting the 6T SRAM cells to the MAC circuit; and an analog-to-digital converter (ADC) having a ring oscillator (RO) of a plurality of stages, a voltage-to-time converter (VTC), and a time-to-digital converter (TDC). An output signal of the MAC circuit is input to the VTC. The plurality of stages of the RO are input to the TDC. An output of the VTC is input to the TDC.

In one aspect, this disclosure relates to charge-domain IMC circuit that includes: a cluster of a plurality of 6T SRAM cells; a charge-domain MAC circuit; a bit-line connecting the 6T SRAM cells to the MAC circuit; and an ADC. The ADC is a charge-injection successive-approximation register (ciSAR) ADC. An output of the MAC circuit is input to a charge-injection cell of the ADC.

In one aspect, this disclosure relates to a method for charge-domain IMC. The method includes: clustering a plurality of 6T SRAM cells; connecting bit-lines of the 6T SRAM cells using an LBL; forming a charge-domain MAC circuit that includes a MOS transistor, an input switch, an output switch, an input port, an output port, and a capacitor; connecting the LBL to a gate of the MOS transistor; connecting a first terminal of the MOS transistor to a DC voltage; connecting a second terminal of the MOS transistor to the output port via the output switch; connecting the second terminal of the MOS transistor to the input port via the input switch; connecting the second terminal of the MOS transistor to a first side of the capacitor; and connecting a second side of the capacitor to ground.

In one aspect, this disclosure relates to a method for charge-domain IMC. The method includes: clustering a plurality of 6T SRAM cells; connecting bit-lines of the 6T SRAM cells using an LBL; forming a charge-domain MAC circuit that includes a MOS transistor, an input switch, an input port, an output port, and a capacitor; connecting the LBL to a gate of the MOS transistor; connecting a first terminal of the MOS transistor to a DC voltage; connecting a second terminal of the MOS transistor to a first side of the capacitor; connecting the second terminal of the MOS transistor to the input port via the input switch; and connecting a second side of the capacitor to the output port.

In one aspect, this disclosure relates to a method for charge-domain IMC. The method includes: clustering a plurality of 6T SRAM cells; connecting bit-lines of the 6T SRAM cells using an LBL; forming a charge-domain MAC circuit that includes a MOS transistor, an input port, an output port, and a capacitor; connecting the LBL to a gate of the MOS transistor; connecting a first terminal of the MOS transistor to the input port; connecting a second terminal of the MOS transistor to a first side of the capacitor; and connecting a second side of the capacitor to the output port.

In one aspect, this disclosure relates to a method for charge-domain IMC. The method includes: clustering a plurality of 6T SRAM cells; connecting bit-lines of the 6T SRAM cells using an LBL; connecting the 6T SRAM cells to a charge-domain MAC circuit using a bit-line; forming an ADC using an RO of a plurality of stages, a VTC, and a TDC, wherein the plurality of stages of the RO are input to the TDC; connecting an output of the MAC circuit to an input of the VTC; and connecting an output of the VTC to an input of the TDC.

In one aspect, this disclosure relates to a method for charge-domain IMC. The method includes: clustering a plurality of 6T SRAM cells; connecting bit-lines of the 6T SRAM cells using an LBL; connecting the 6T SRAM cells to a charge-domain MAC circuit using a bit-line; and connecting the MAC circuit to an ADC. The ADC is a ciSAR ADC. An output of the MAC circuit is input to a charge-injection cell of the ADC.

Figure 1:
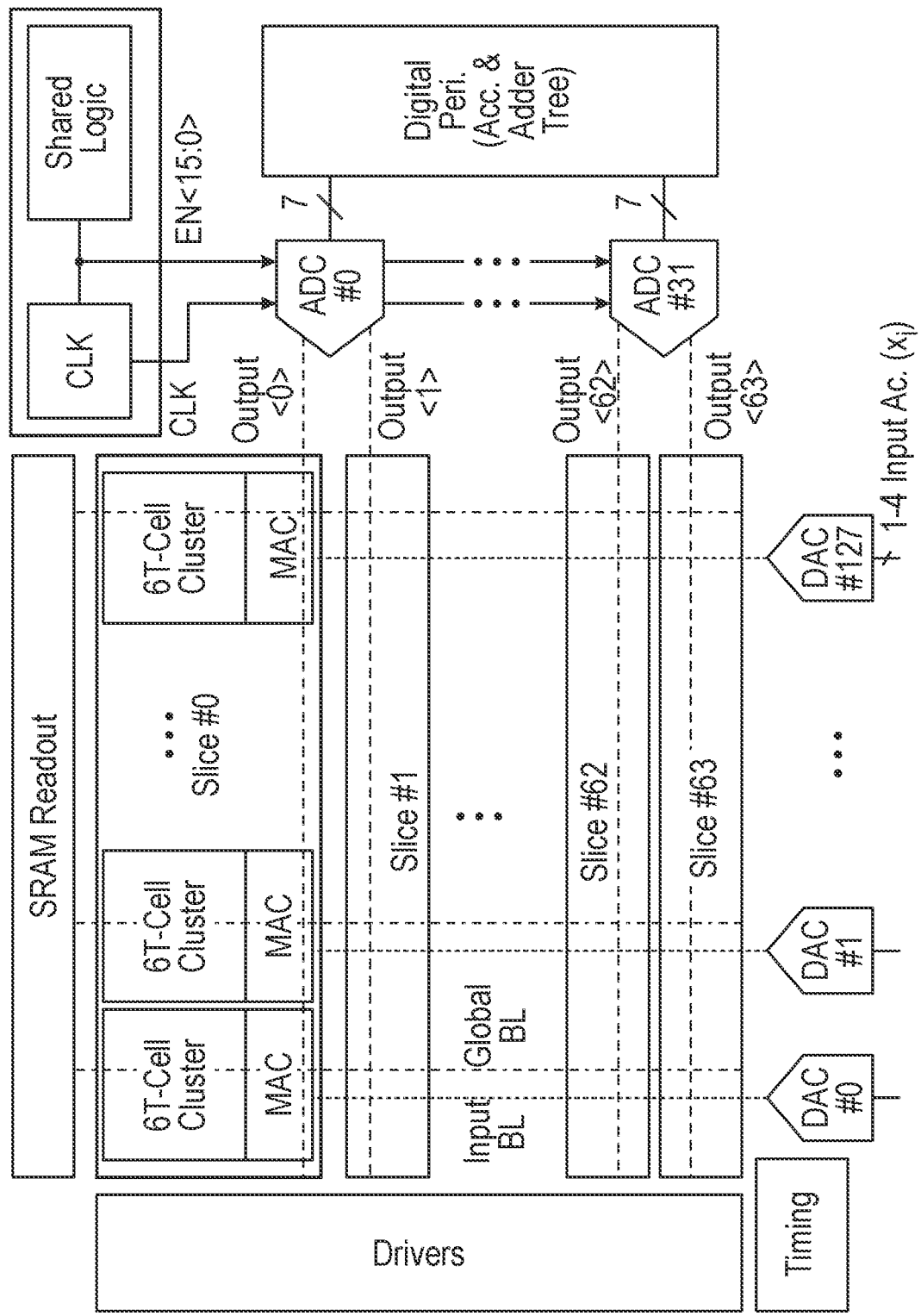
FIG. 1 shows the architecture of the charge-domain IMC circuit according to one or more embodiments, along with some peripheral circuitry.

Unless otherwise expressly noted in this specification, the broken lines in the drawings are not meant to indicate and should not be interpreted as indicating optional features or features that are not part of the invention. Instead, the broken lines in the drawings are used for: a) showing the functional division between circuit blocks; b) illustrating elements of a circuit block that is a part of a larger circuit; c) distinguishing signals or curves in the same figure; or d) showing readings of points on a curve in a coordinate system. These uses are commonly adopted in technical drawings in the art and one of ordinary skill in the art would readily understand the meaning of the broken lines specifically used in the drawings of this application.

DETAILED DESCRIPTION

Specific embodiments of the invention will now be described in detail with reference to the accompanying figures. Like elements in the various figures are denoted by like reference numerals for consistency. Like elements may not be labeled in all figures for the sake of simplicity.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers does not imply or create a particular ordering of the elements or limit any element to being only a single element unless expressly disclosed, such as by the use of the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements.

In the following description of FIGS. 1-19, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

It is to be understood that the singular forms "a," "an," and "the" include plural referents unless the context clearly dictates otherwise. Thus, for example, reference to "a horizontal beam" includes reference to one or more of such beams.

Terms such as "approximately," "substantially," etc., mean that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

In the following description, the terms "VDD" and "VDD" both refer to a DC supply voltage of a circuit, and the terms "ground" and "GND" both refer to another DC supply voltage of a circuit. These terms are commonly used by one of ordinary skill in the art as references for measuring digital and analog signals in a circuit.

In the following description, unless otherwise expressly noted, the terms "connect," "connected," and "connecting" refer to electronic connection between circuit elements and should not be interpreted as limited to physical connection only. The connection may be implemented via conductive wire, via semiconductor fabrication processes, or other means that are readily available in the art.

Although multiple dependent claims are not introduced, it would be apparent to one of ordinary skill that the subject matter of the dependent claims of one or more embodiments may be combined with other dependent claims.

Conventional IMCs face tradeoffs among computing accuracy, memory density, and precision configurability. In light of these tradeoffs, embodiments of this disclosure describe a charge-domain IMC circuit with a compact memory structure and a reconfigurable semi-parallel computing scheme supporting multiple levels of input activations and weights. While only a limited number of embodiments are described in detail below, one of ordinary skill in the art would understand that the invention could be embodied in forms other than those described in this specification.

FIG. 1 shows the architecture of a charge-domain IMC circuit according to one or more embodiments, along with the peripheral circuitry for applications such as CNN. As shown in FIG. 1, a plurality of 6T SRAM cells are clustered (6T-Cell Cluster) and connected to a charge-domain MAC circuit (MAC), 128 instances of the cluster-MAC combination form a slice, and 64 slices, numbered from 0 to 63, are formed. In each slice, each cluster-MAC combination receives an input (Input BL) from a corresponding digital-to-analog converter (DAC), which converts a 4-bit digital input to an analog signal for MAC. Each slice has an output line, numbered from Output <0> to Output <63>, that are connected to the inputs of an ADC. The ADCs quantize the computing results on the output lines to generate digital codes, which are registered and sent to the digital periphery. The digital periphery includes serial accumulators and adder trees to accumulate partial sums and combines to support programmable input and weight precision.

In addition, the architecture shown in FIG. 1 includes 128 global bit-lines (Global BL, GBL), each connecting a corresponding cluster-MAC combination in all the slices to an SRAM Readout. The architecture also includes standard circuit components such as drivers and timing circuitry. Further, the ADCs in the architecture may be 7-bit successive-approximation register (SAR) ADCs, which come with a clock module (CLK) and shared SAR logic that provide 16-bit enable signals (EN) to the ADCs.

The architecture shown in FIG. 1 thus together have 128 4-bit DACs, 128×64 instances of combination of a 6T-Cell Cluster and MAC, and 32 7-bit ADCs. However, these numbers of instances and resolutions (i.e., number of bits) are for illustrative purpose only and not to be limiting the scope of the invention. Some embodiments may have different numbers of slices and cluster-MAC combinations per slice, and may have different DAC or ADC resolutions.

The architecture includes a piece of logic shared by the ADCs ("Shared Logic" in FIG. 1. As noted above, the ADCs in FIG. 1 may be SAR ADCs, in which case the Shared Logic may be SAR logic. However, other types of ADCs may be used in some embodiments and the Shared Logic may be of other types. More detailed description of the ADCs can be found later in this specification.

Additionally, some blocks are shown in FIG. 1 to help understand the overall architecture under which the charge-domain IMC circuit may be implemented. It is noted that not all blocks in FIG. 1 are required by all embodiments, nor is FIG. 1 meant to be a diagram showing all required components of the charge-domain IMC circuit.

The slices support both 2's complement and ternary encodings of weights, which are most common in CNN quantization. The computation and quantization can be programed to single-ended or differential modes to support the two encoding schemes in different CNN layers.

Figure 2A:
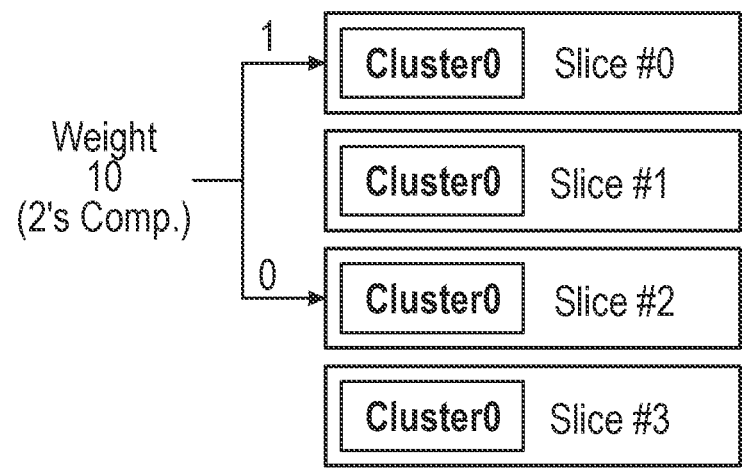
FIGS. 2A and 2B provide examples to illustrate the mapping of 2's complement encoding and ternary encoding, respectively.

In some embodiments, the 2's complement encoded data are binary and, thus, only require a single SRAM cell for each bit. To conduct IMC for k-bit 2's complement weights, they may be stored in the same column but k neighboring pairs of slices, as exemplified in FIG. 2A. In the example of FIG. 2A, the two slices in each pair (i.e., the pair of #0 and #1 and the pair of #2 and #3) alternately turn on with the ADC set to single-ended mode. To obtain the final MAC result, k consecutive ADC outputs may be shifted and summed up, which are done in the digital periphery. Since the most significant bit (MSB) is negative, the sign of the corresponding partial sum needs to be reversed. The 2's complement encoding may be advantageous due to storage efficiency because k bit cells contain k-bit information.

Figure 2B:
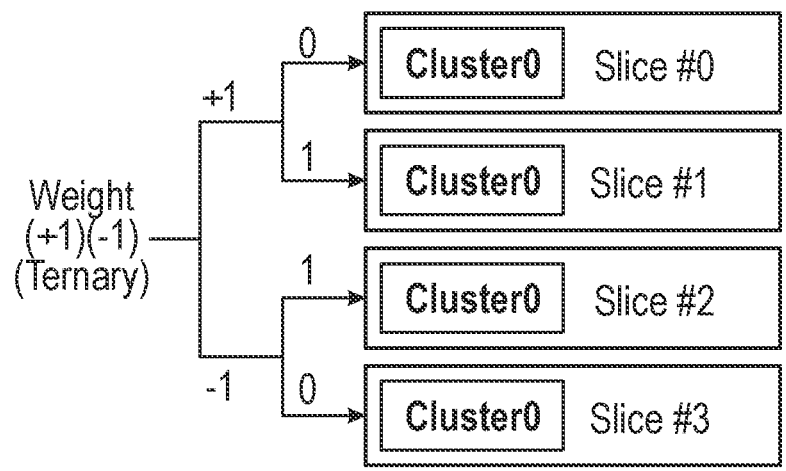

On the other hand, each ternary encoding unit (−1, 0, +1) requires two binary SRAM cells. For example, $6=2^3 \times (+1) + 2^2 \times (-1) + 2^1 \times (+1) + 2^0 \times (0)$. As shown in FIG. 2B, two cells with the same index within a slice pair store one encoding unit: "01" for "+1," "10" for "−1," and "00" for "0." The ADCs run in differential mode and, hence, naturally perform the subtraction of the positive and negative results without extra processing. In general, to store k-bit information, 2k−2 bitcells are needed for ternary encoding, but only k−1 ADCs are required. This is particularly useful for ternary neural networks with only weights of (−1, 0, +1), because they require the same memory footprint as 2-bit 2's complement weights, while saving one ADC for each MAC.

Figure 3A:
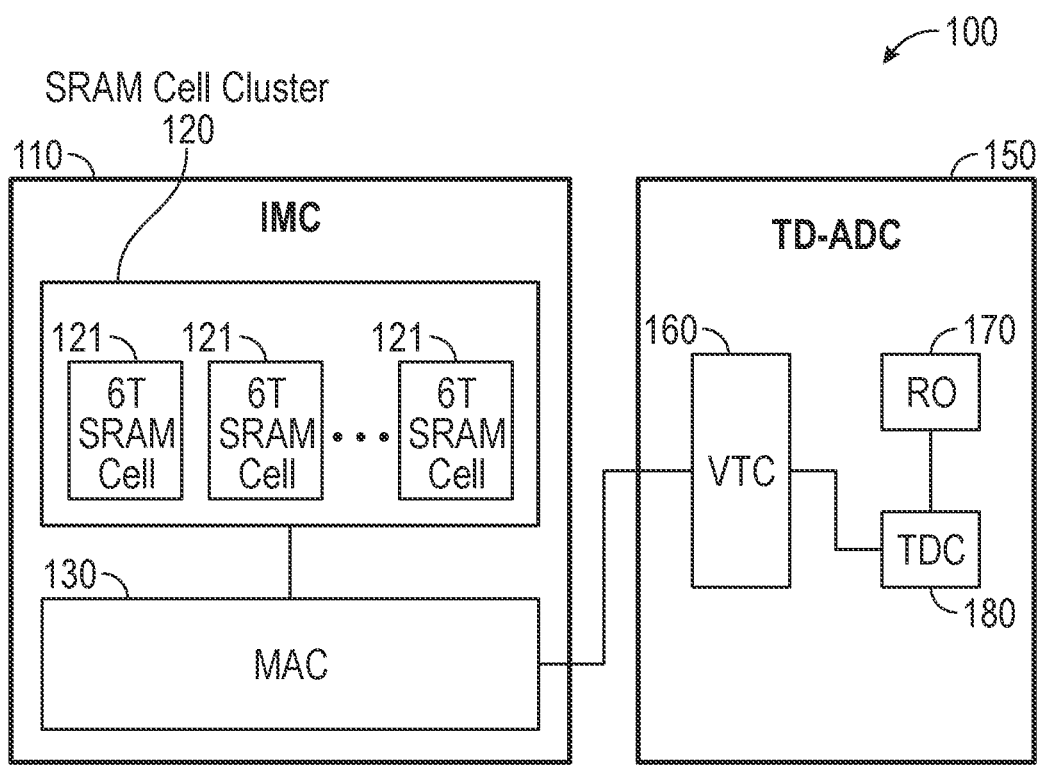
FIGS. 3A and 3B each show a block diagram of the charge-domain IMC circuit according to one or more embodiments.
Figure 3B:
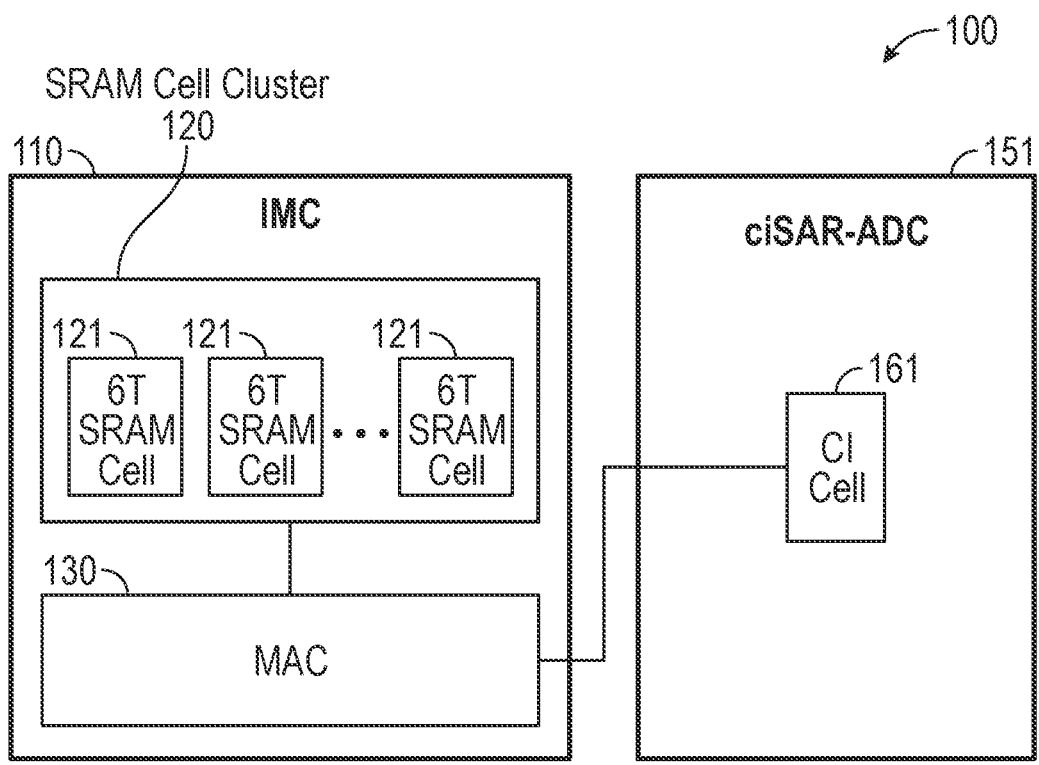

FIGS. 3A and 3B each show a block diagram of the charge-domain IMC circuit according to one or more embodiments. The charge-domain IMC circuit 100 in both FIGS. 3A and 3B has an IMC block 110. Consistent with the architecture in FIG. 1, the IMC block 110 has an SRAM Cell Cluster 120 composed of a plurality of 6T SRAM Cells 121, and has a MAC circuit 130.

The charge-domain IMC circuit 100 in FIGS. 3A and 3B also has an ADC, which receives an input from the MAC circuit 130. The ADC may be of various types. In the example of FIG. 3A, the ADC is a TD-ADC 150 that includes an RO 170, a VTC 160, and a TDC 180. More detailed description of the TD-ADC 150 can be found later in this specification.

In some examples, a ciSAR ADC 151 may be used in lieu of the TD-ADC 150. As shown in FIG. 3B, the ciSAR ADC 151 has a CI cell 161, which receives an input from the MAC 130.

While the concept of ciSAR ADC was previously known in a different context, using ciSAR ADCs for a charge-domain IMC circuit in one or more embodiments has demonstrated notable and unexpected advantages, especially in terms of circuit complexity and size, as compared to conventional capacitor-based SAR ADCs. A discussion of the concept of ciSAR ADC and the advantages thereof can be found in U.S. Provisional Patent Application No. 63/160, 572, which was filed on Mar. 12, 2021, and is incorporated herein by reference.

FIGS. 4A-7D provide examples of the IMC block 130 shown in FIGS. 3A and 3B. As described above, an IMC block includes a cluster of 6T SRAM cells (6T Cells) and a charge-domain MAC circuit. The bit-lines of the SRAM cells are connected to an LBL that connects the cluster to the MAC circuit. Depending on the design of the MAC circuit, especially the connection of a capacitor (CMOM in the figures), the examples in FIGS. 4A-7D generally fall into 4 categories, each of which is described in detailed below.

Figure 4A:
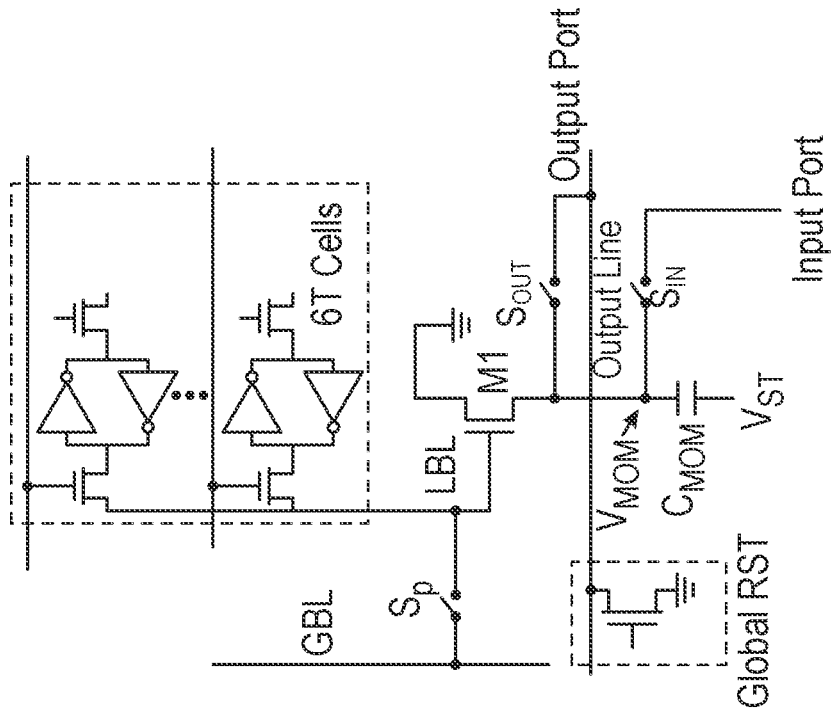
FIGS. 4A-7D provide examples of the IMC block shown in the block diagrams of FIGS. 3A and 3B.
Figure 4B:
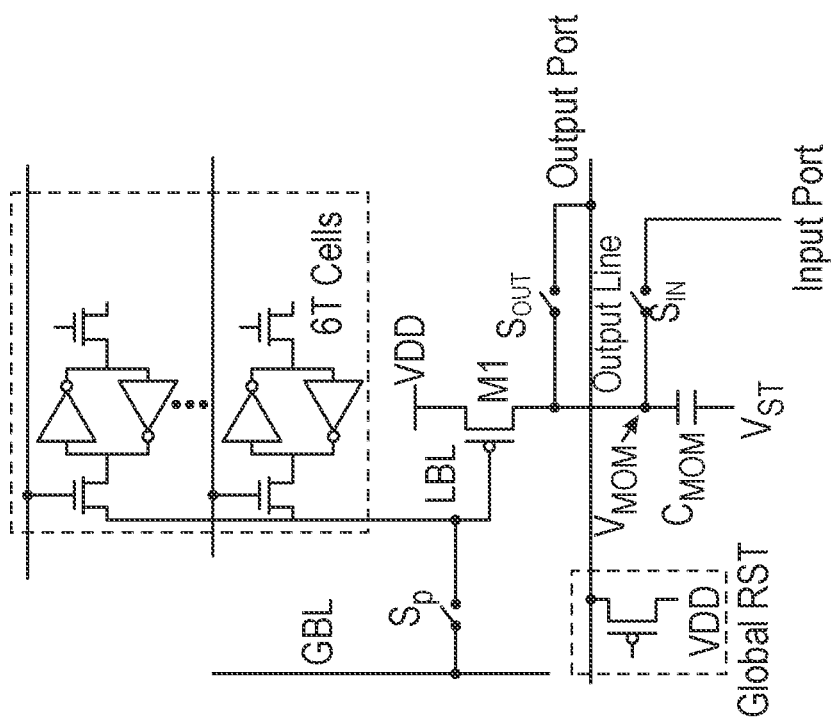
Figure 4C:
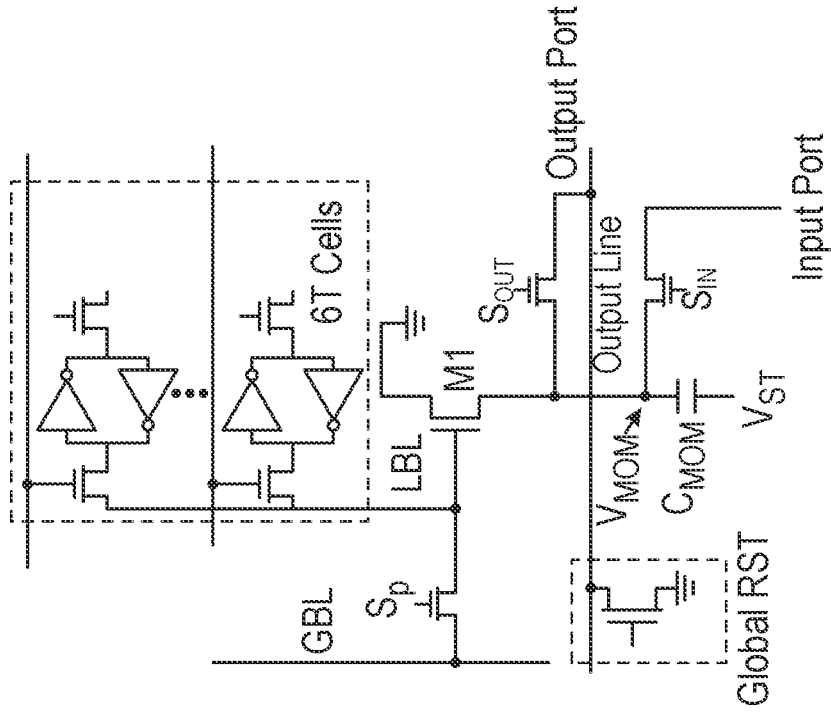
Figure 4D:
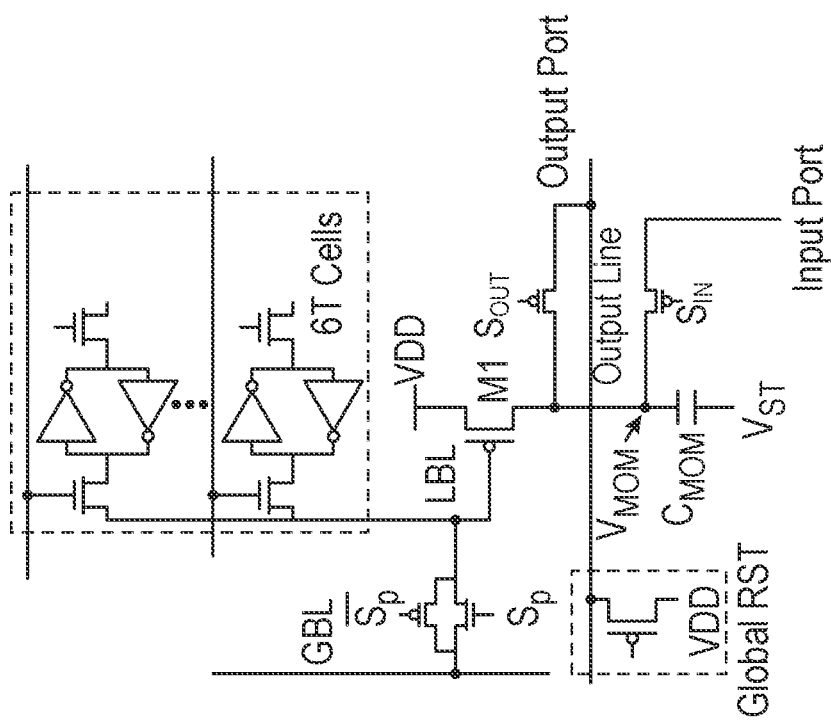

The first category is shown in FIGS. 4A-4D. FIGS. 4A and 4B each show an example at the schematic level while FIGS. 4C and 4D show examples of transistor-level implementation corresponding to the schematics of FIGS. 4A and 4B.

In the examples of FIGS. 4A and 4B, the MAC circuit includes a MOS transistor M1, an input switch $S_{IN}$, an output switch $S_{OUT}$, an input port, an output port, and a capacitor, e.g., a MOM capacitor, $C_{MOM}$. The LBL is connected to the gate of the MOS transistor M1 to switch the MOS transistor M1 on and off. The MOS transistor M1 may be a PMOS transistor (FIGS. 4A and 4C), an NMOS transistor (FIGS. 4B and 4D), or a transistor of other types. One of the source and drain terminals of the MOS transistor M1 is connected to a DC voltage, such as $V_{DD}$ in FIGS. 4A and 4C and ground in FIGS. 4B and 4D, while the other of the source and drain terminals is connected to a first side of the capacitor $C_{MOM}$ and is also connected to the input port via the input switch $S_{IN}$. A second side of the capacitor $C_{MOM}$ is connected to a starting voltage $V_{ST}$ that may be tuned to adjust the transfer curve of a TD-ADC (described later). In embodiments where the TD-ADC does not need tuning, $V_{ST}$ may be ground.

In the examples of FIGS. 4A and 4B, the MAC circuit may also include a reset switch (Global RST in the figures) and an output line that connects the reset switch Global RST to the output port. The MAC circuit may also include a pre-charge & read/write switch $S_p$ and a GBL. The GBL is connected to the LBL and further to the gate of the MOS transistor M1 via the pre-charge & read/write switch $S_p$.

The aforementioned switches $S_{OUT}$, $S_{IN}$, Global RST, and $S_p$ may be implemented using PMOS, NMOS, transmission gates (TGs), or combination thereof. Examples of the implementations are shown in FIGS. 4C and 4D.

Figures 5C, 5D:
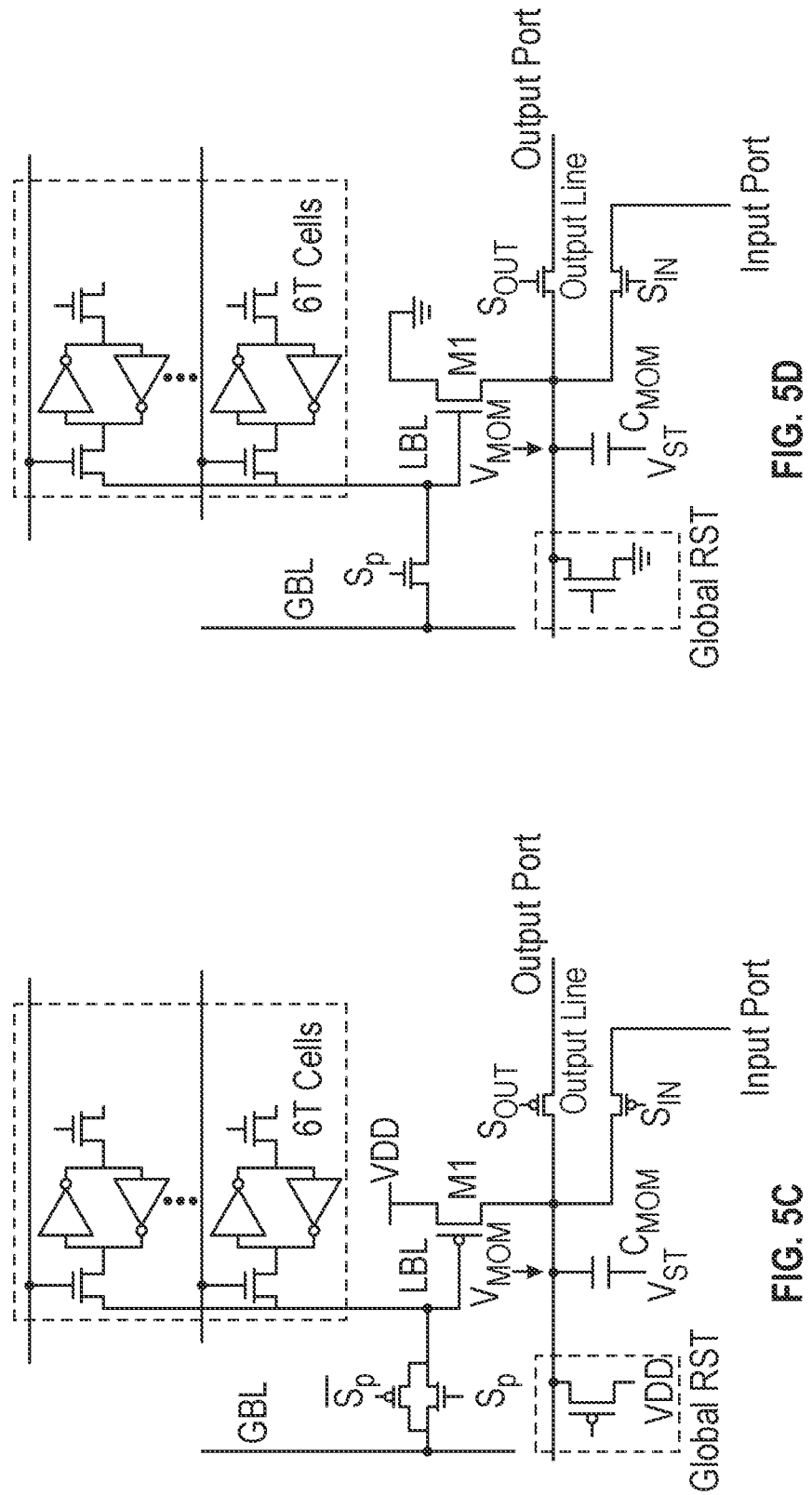

The second category is shown in FIGS. 5A-5D. FIGS. 5A and 5B each show an example at the schematic level while FIGS. 5C and 5D show examples of transistor-level implementation corresponding to the schematics of FIGS. 5A and 5B.

As can been seen from the figures, the first category and the second category differ primarily in the location of the output switch Sour: In first category, the output switch $S_{OUT}$ is connected to the output port via a wire separate from the output line, while in FIG. 4B, the output switch $S_{OUT}$ is electrically situated on the output line. Despite this difference, the key idea behind the circuit design and the principle of operation is the same in these two categories.

Similar to the first category, the aforementioned switches $S_{OUT}$, $S_{IN}$, Global RST, and $S_p$ may be implemented using PMOS, NMOS, TGs, or combination thereof. Examples of the implementations are shown in FIGS. 5C and 5D.

Figure 6A:
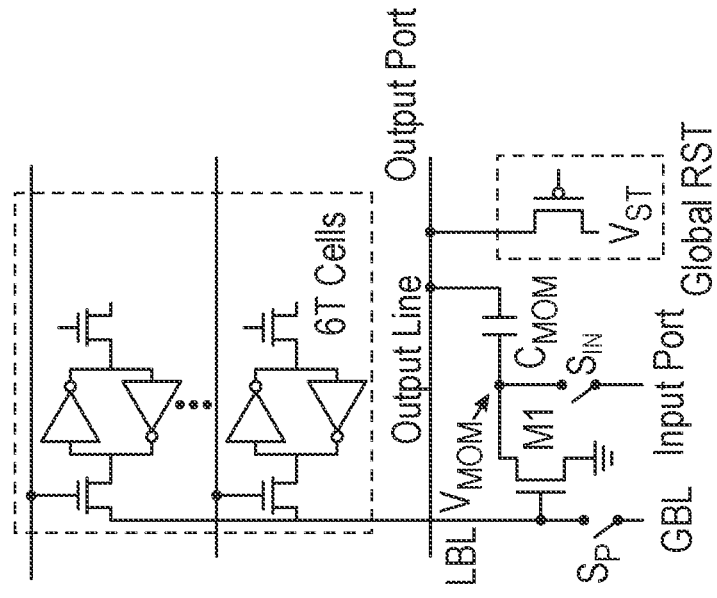
Figure 6B:
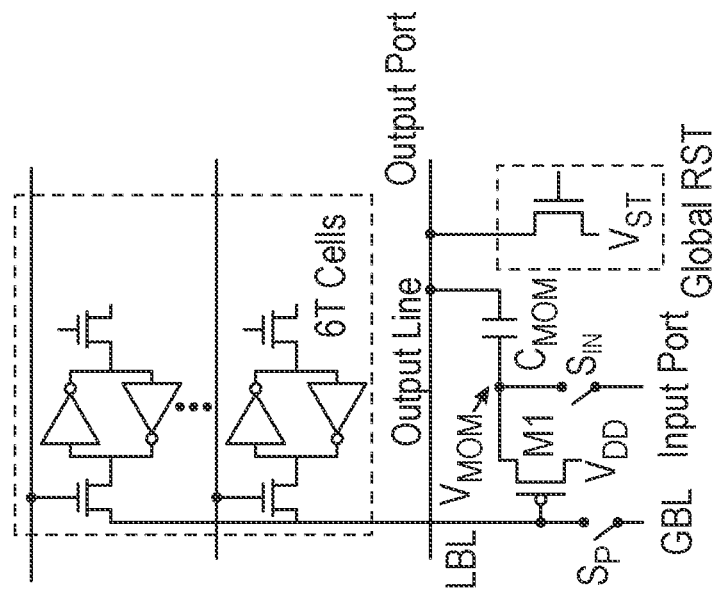

The third category is shown in FIGS. 6A-6D. FIGS. 6A and 6B each show an example at the schematic level while FIGS. 6C and 6D show examples of transistor-level implementation corresponding to the schematics of FIGS. 6A and 6B.

In the examples of FIGS. 6A and 6B, the MAC circuit includes, besides the cluster of 6T SRAM cells and the LBL, a MOS transistor M1, an input switch $S_{IN}$, an input port, an output port, and a capacitor, e.g., a MOM capacitor, $C_{MOM}$. The MOS transistor M1 may be a PMOS transistor (FIGS. 6A and 6C), an NMOS transistor (FIGS. 6B and 6D), or a transistor of other types. One of the source and drain terminals of the MOS transistor M1 is connected to a DC voltage, such as $V_{DD}$ in FIGS. 6A and 6C and ground in FIGS. 6B and 6D, while the other of the source and drain terminals is connected to a first side of the capacitor $C_{MOM}$ and is also connected to the input port via the input switch $S_{IN}$. So far, the circuit of the third category is very similar to those of the first and the second categories.

In the third category, the second side of the capacitor $C_{MOM}$ is not directly connected to $V_{ST}$ but instead connected to the output port, as can be seen from the figures. Similar to the first and the second categories, the MAC circuit in the third category may also include a reset switch (Global RST in the figures) and an output line that connects the reset switch Global RST to the output port. $V_{ST}$ in the third category is applied to the reset switch Global RST and may be equal to $V_{DD}$ or ground in embodiments where the TD-ADC does not need tuning. The MAC circuit may also include a pre-charge & read/write switch $S_p$ and a GBL. The GBL is connected to the LBL and further to the gate of the MOS transistor M1 via the pre-charge & read/write switch $S_p$.

One notable difference between the third category and the earlier two categories is that the third category does not have an output switch. Instead, the reset switch Global RST serves as the output switch in the third category.

Similar to the earlier two categories, the aforementioned switches $S_{IN}$, Global RST, and $S_p$ may be implemented using PMOS, NMOS, TGs, or combination thereof. Examples of the implementations are shown in FIGS. 6C and 6D.

Figures 7A, 7B:
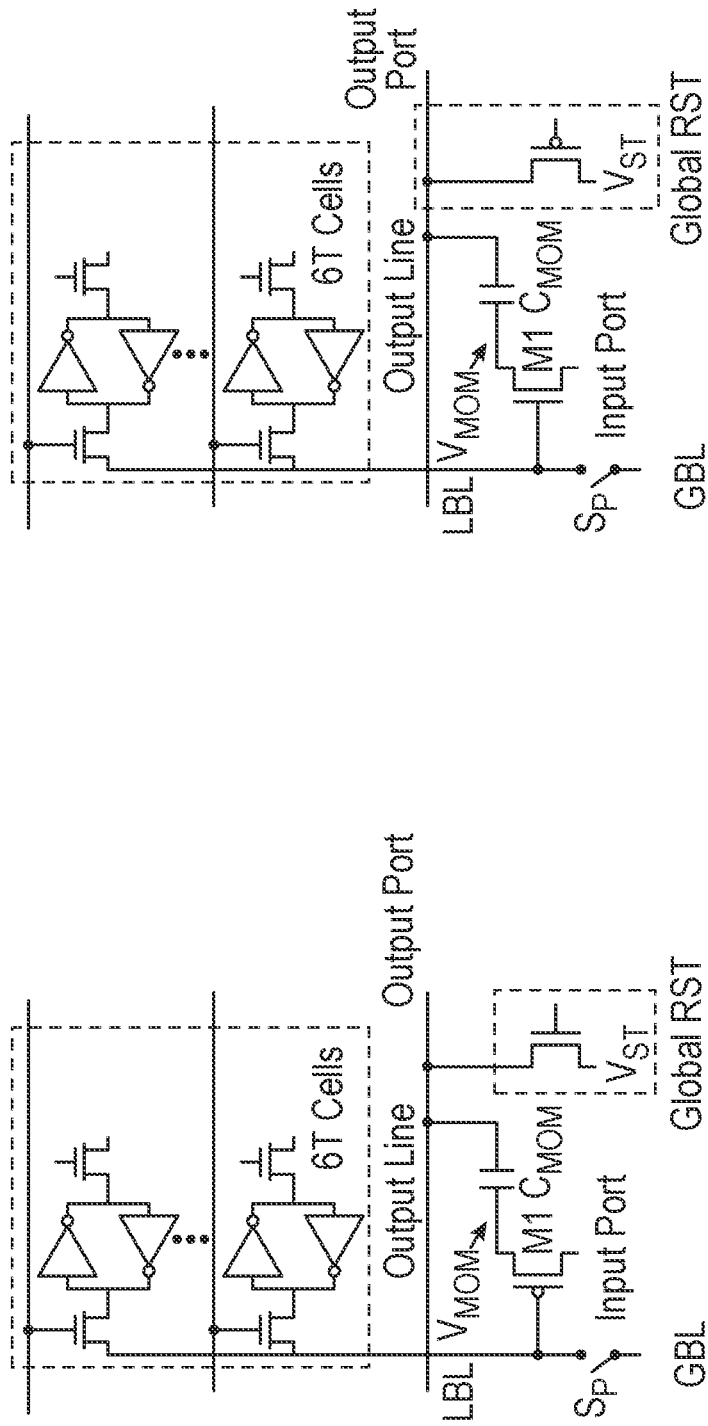

The fourth category is shown in FIGS. 7A-7D. FIGS. 7A and 7B each show an example at the schematic level while FIGS. 7C and 7D show examples of transistor-level implementation corresponding to the schematics of FIGS. 7A and 7B.

In the examples of FIGS. 6A and 7B, the MAC circuit includes, besides the cluster of 6T SRAM cells and the LBL, a MOS transistor M1, an input port, an output port, and a capacitor, e.g., a MOM capacitor, $C_{MOM}$. The MOS transistor M1 may be a PMOS transistor (FIGS. 6A and 6C), an NMOS transistor (FIGS. 6B and 6D), or a transistor of other types. One of the source and drain terminals of the MOS transistor M1 is connected to the input port, while the other of the source and drain terminals is connected to a first side of the capacitor $C_{MOM}$. Similar to the third category, the second side of the capacitor $C_{MOM}$ is connected to the output port in the fourth category. $V_{ST}$ in the fourth category is applied to the reset switch Global RST and may be equal to $V_{DD}$ or ground in embodiments where the TD-ADC does not need tuning. Also similar to the third category, the MAC circuit in the fourth category may include a reset switch (Global RST in the figures) and an output line that connects the reset switch Global RST to the output port. The MAC circuit may also include a pre-charge & read/write switch $S_p$ and a GBL. The GBL is connected to the LBL and further to the gate of the MOS transistor M1 via the pre-charge & read/write switch $S_p$.

The fourth category has the simplest circuit among the 4 due to the absence of the input switch and the output switch. Functionally, the MOS transistor M1 serves as the input switch and the reset switch Global RST serves as the output switch. As a tradeoff for simplicity, the fourth category offers the smallest dynamic range among the 4 categories.

Similar to the earlier 3 categories, the aforementioned switches Global RST and $S_p$ may be implemented using PMOS, NMOS, TGs, or combination thereof. Examples of the implementations are shown in FIGS. 7C and 7D.

It is noted that the "input port" and the "output port" mentioned in this application should not be narrowly construed as only to mean hardware elements implemented on the physical circuit. Rather, the "input port" may be a designation that refers to a region where an input BL intersects the MAC circuit boundary, and the "output port" may be a designation that refers to a region where an output line intersects the MAC circuit boundary.

As noted above, a great variety of transistor-level implementations is available for the switches in the circuits of FIGS. 4A, 4B, 5A, 5B, 6A, 6B, 7A, and 7B. Table 1 below provides the voltage control conditions for some of the switches based on the transistor-level implementation. Several examples for interpreting the table are given below.

TABLE 1

|  |  | NMOS | PMOS | Transmission Gate |
|---|---|---|---|---|
| FIG. 4A | $S_p$ | Overdrive | Underdrive (for write) | Normal |
|  | $S_{IN}$ | Overdrive | Normal |  |
|  | $S_{OUT}$ | Overdrive | Normal |  |
| FIG. 4B | $S_p$ | Normal | Underdrive |  |
|  | $S_{IN}$ | Normal | Underdrive |  |
|  | $S_{OUT}$ | Normal | Underdrive |  |
| FIG. 5A | $S_p$ | Overdrive | Underdrive (for write) |  |
|  | $S_{IN}$ | Overdrive | Normal |  |
| FIG. 5B | $S_p$ | Normal | Underdrive |  |
|  | $S_{IN}$ | Normal | Underdrive |  |
| FIG. 6A | $S_p$ | Overdrive | Underdrive |  |
| FIG. 6B | $S_p$ | Overdrive | Underdrive |  |

As an example for interpreting Table 1, for embodiments with circuits according to FIG. 4A, if the pre-charge & read/write switch $S_p$ is implemented as an NMOS, then the NMOS may be supplied with an Overdrive voltage; if $S_p$ is implemented as a PMOS, then the PMOS may be supplied with an Underdrive voltage when performing a Write access; if $S_p$ is implemented as a TG, then the TG may be supplied with a normal voltage.

As another example for interpreting Table 1, for embodiments with circuits according to FIG. 5B, if the input switch $S_{IN}$ is implemented as an NMOS, then the NMOS may be supplied with a normal voltage; if $S_{IN}$ is implemented as a PMOS, then the PMOS may be supplied with an Underdrive voltage; if $S_{IN}$ is implemented as a TG, then the TG may be supplied with a normal voltage.

As another example for interpreting Table 1, for embodiments with circuits according to FIG. 6A, if the pre-charge & read/write switch $S_p$ is implemented as an NMOS, then the NMOS may be supplied with an Overdrive voltage; if $S_p$ is implemented as a PMOS, then the PMOS may be supplied with an Underdrive voltage; if $S_p$ is implemented as a TG, then the TG may be supplied with a normal voltage.

In terms of charge flow via the input port, the capacitor $C_{MOM}$ discharges from $V_{DD}$ in FIGS. 4A, 5A, 6A, and 7A and charges from ground in FIGS. 4B, 5B, 6B, and 7B. With respect to the concepts of "Overdrive voltage," "Underdrive voltage," and "normal voltage," the meanings of these concepts are readily known to one of ordinary skill in the art and are omitted from this specification.

In one or more embodiments, MAC is primarily divided into 4 phases, pre-charging, digital-to-analog conversion, multiplication, and accumulation, with an optional fifth phase for some embodiments, adjustment of starting voltage. In the pre-charging phase, the LBL, the capacitor $C_{MOM}$, and the parasitic capacitance on the output line (inherent in the MAC circuit, not shown in the figures) are pre-charged. In the digital-to-analog conversion phase, a multiple-bit digital input is converted by the DAC into an analog voltage applied on the input port and sampled on the capacitor $C_{MOM}$. In the multiplication phase, one of the 6T cells is accessed by turning on the corresponding word line (WL) whose voltage defines the logic value of the multiplier bit. The voltage across the capacitor $C_{MOM}$, $V_{MOM}$, is either pulled up/pulled down or kept at the sampled input voltage from the DAC depending on the multiplier bit. In the accumulation phase, addition is performed such that the local charge is shared across the parasitic wire capacitance and all capacitors $C_{MOM}$ that are connected to the output line. After these 4 phases, the optional phase for adjusting of starting voltage may be executed for circuits in some embodiments.

Figure 8A:
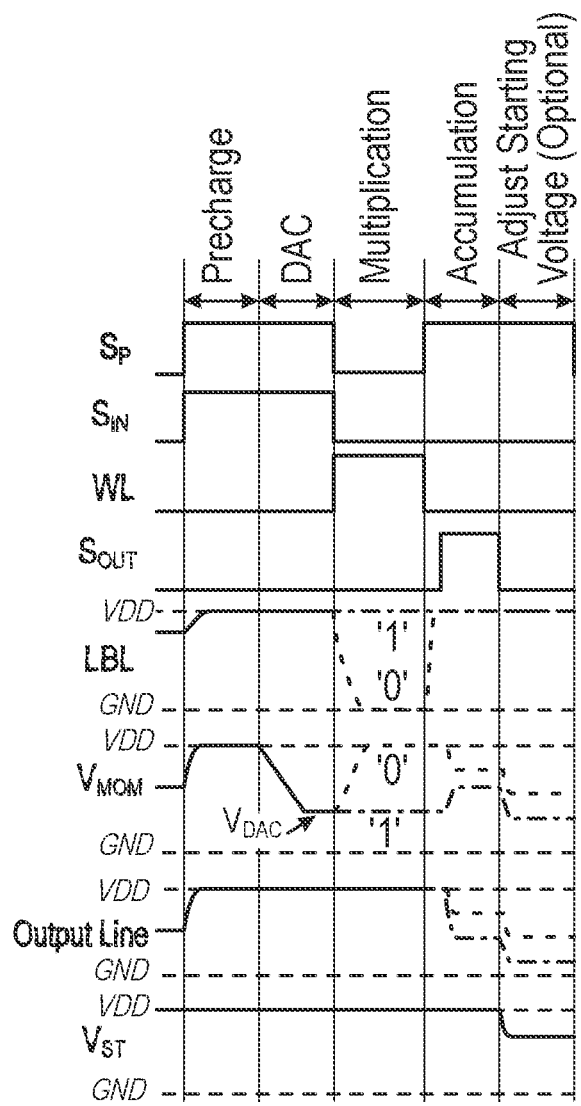
FIGS. 8A-8F show waveforms of some relevant signals in the various phases of MAC according to one or more embodiments.
Figure 8B:
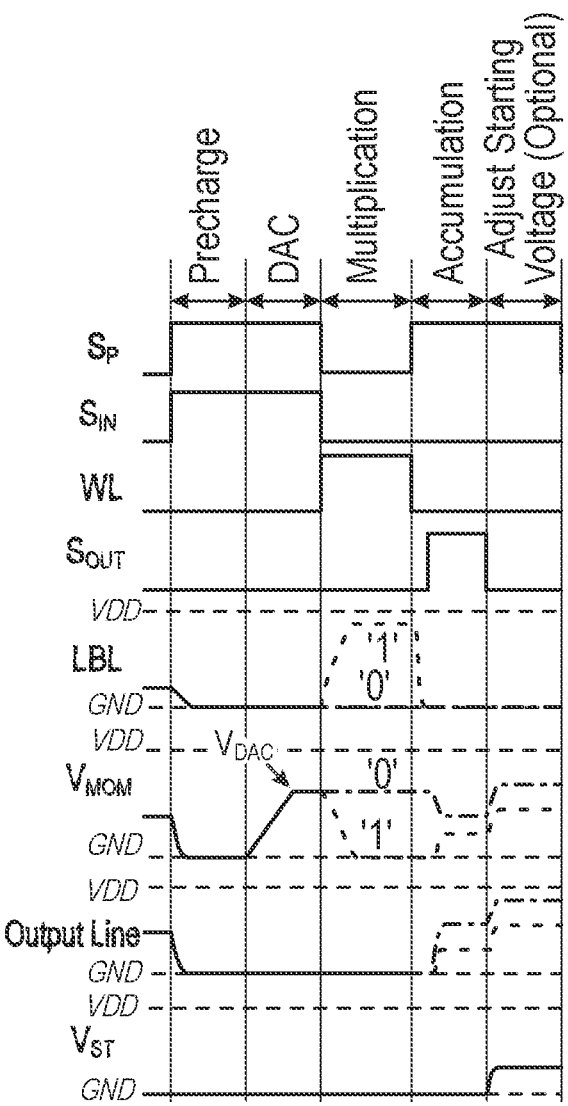
Figure 8C:
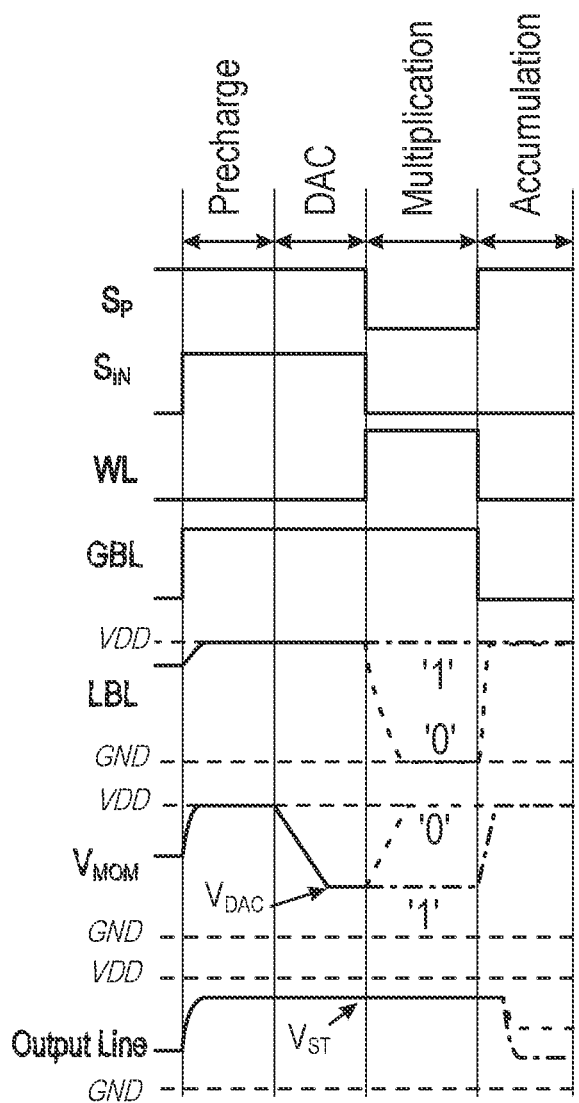
Figure 8D:
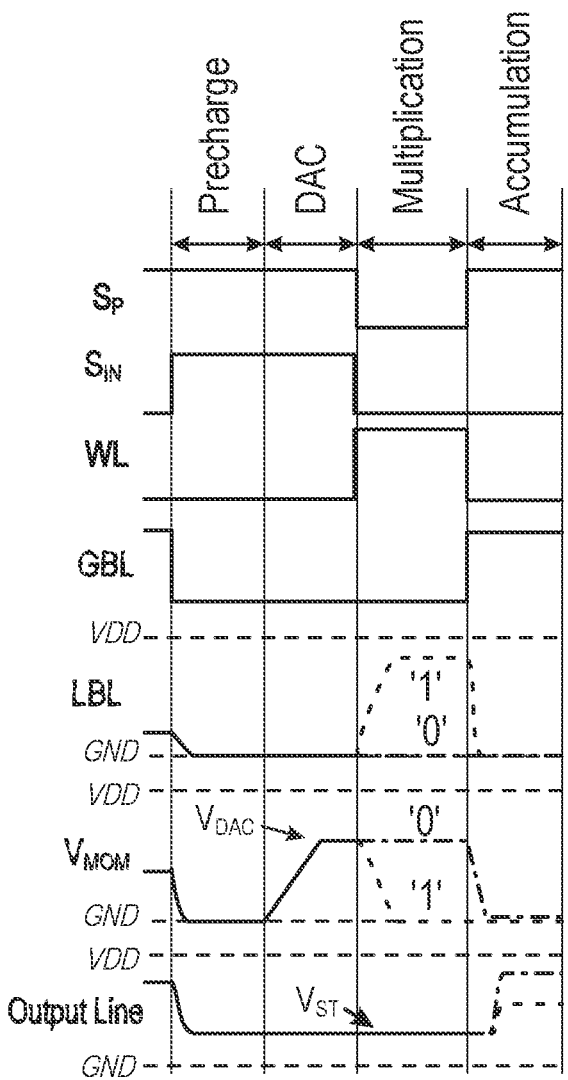
Figure 8E:
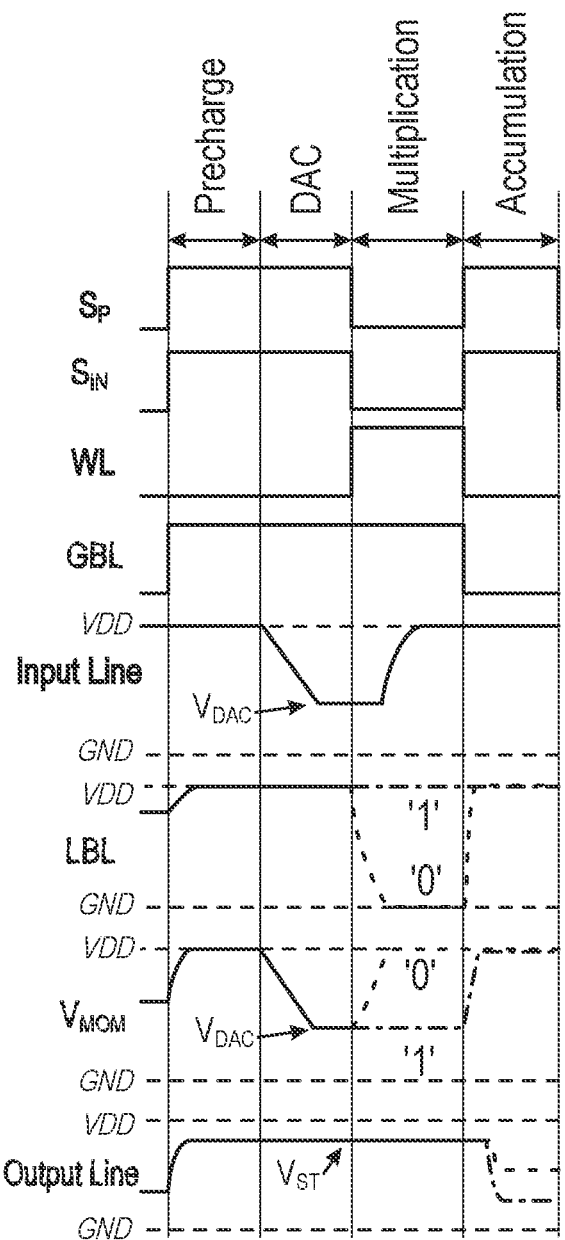
Figure 8F:
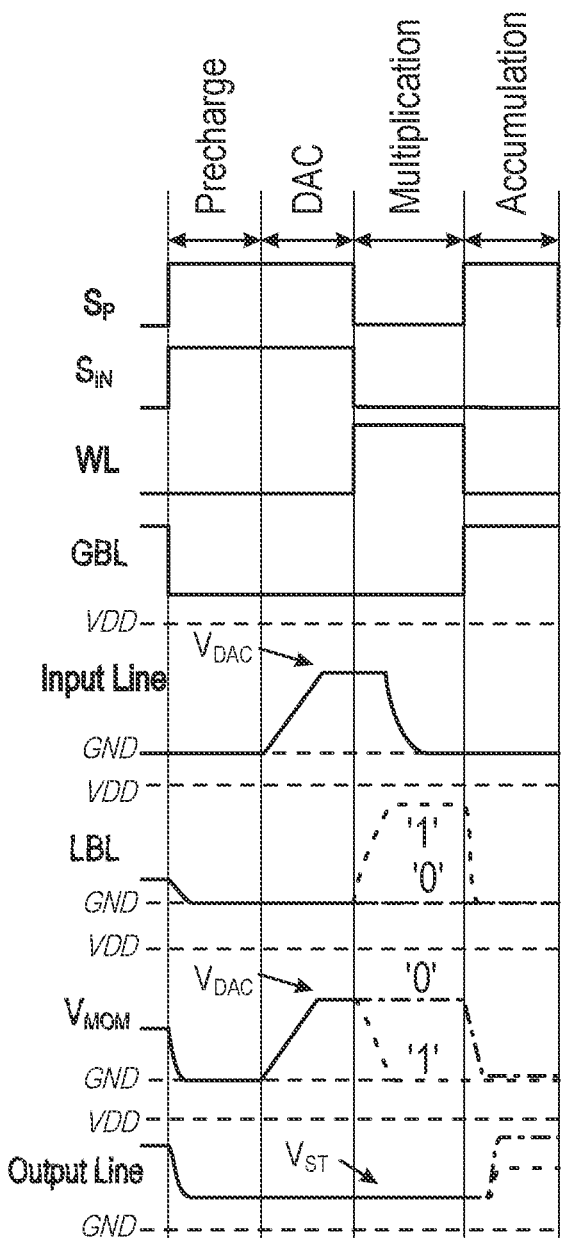

The waveforms of relevant signals in these phases are shown in FIGS. 8A-8F, assuming all of switches $S_p$, Global RST, $S_{IN}$, and $S_{OUT}$ (where applicable) are NMOS switches. FIG. 8A corresponds to the circuit schematic in FIGS. 4A and 5A. FIG. 8B corresponds to the circuit schematic in FIGS. 4B and 5B. FIGS. 8C-8F correspond to the circuit schematics in FIGS. 6A, 6B, 7A, and 7B, respectively. Note that in FIGS. 8A-8F, the horizontal lines labeled VDD and GND do not represent real circuit signals but are used to show the values of a signal. For example, it can be seen in FIG. 8A that the LBL has the value of VDD in the pre-charging phase ("Precharge" in the figure) and in the digital-to-analog conversion phase ("DAC" in the figure); if the data bit is '0,' then the LBL drops to GND in the multiplication phase ("Multiplication" in the figure) and rises to VDD in the accumulation phase ("Accumulation" in the figure); and if the data bit is '1,' then the LBL remains at VDD in the multiplication phase and the accumulation phase. Similar interpretation is applicable to FIGS. 8B-8F.

Although the optional phase for adjustment of starting voltage is shown only in FIGS. 8A and 8B ("Adjust Starting Voltage (Optional)" in the figures), which correspond to the first and second categories of the IMC block, it is noted that all 4 categories may support starting voltage adjustment. For the third and fourth categories, starting voltage adjustment may be performed along with the accumulation phase and thus is not separately labeled as a fifth phase.

Back to the block diagrams in FIGS. 3A and 3B, the IMC block 110 may be connected to an ADC, either the TD-ADC 150 or the ciSAR ADC 151. The ciSAR ADC 151 has already been described above, so the following paragraphs of this specification focus on describing the TD-ADC 150 in FIG. 3A.

Figure 9:
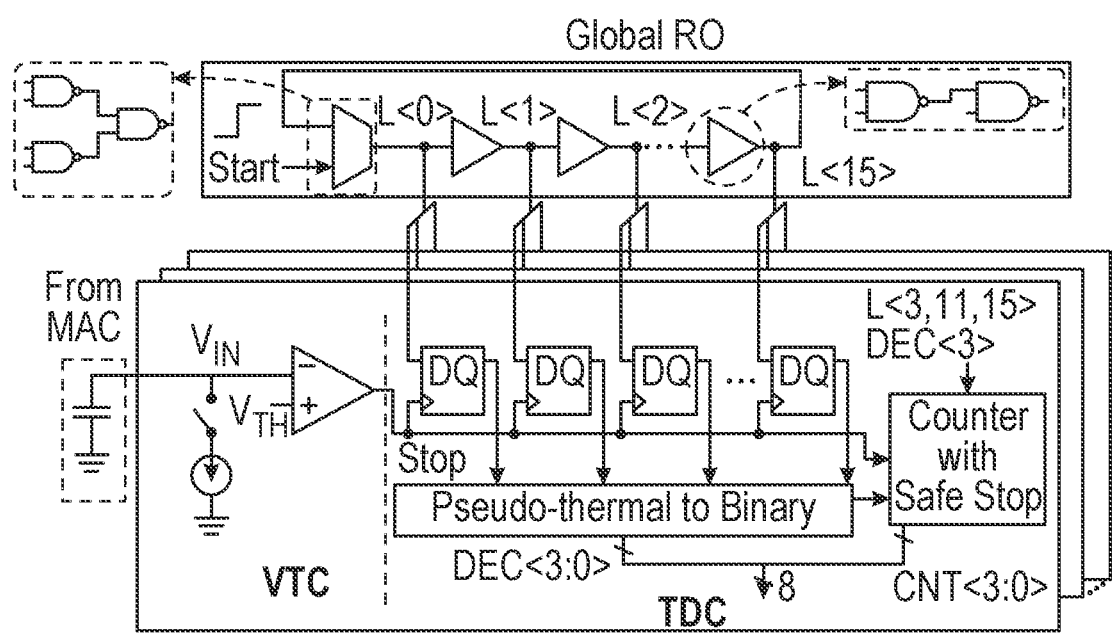
FIG. 9 shows a time-domain ADC (TD-ADC) used in the charge-domain IMC circuit according to one or more embodiments.

The TD-ADC 150, which includes a VTC 160, an RO 170, and a TDC 180, are illustrated in FIG. 9 with more details. The output of the MAC circuit is input to the VTC and becomes $V_{IN}$ across an input capacitor. $V_{IN}$ and a threshold voltage $V_{TH}$ are fed to a comparator, which outputs a pulse when the comparison result changes. Specifically, the input capacitor may be discharged by turning on a current source (shown in FIG. 9 and later FIGS. 12A and 12B as a circle with a downward arrow inside) to allow the discharge current $i_c$ to flow, leading to a change of $V_{IN}$. When $V_{IN}$ changes from being greater than $V_{TH}$ to being less than $V_{TH}$, or in alternative embodiments from being less than $V_{TH}$ to being greater than $V_{TH}$, the comparator of the VTC outputs a pulse to the TDC. In other embodiments, $V_{IN}$ may be kept constant (i.e., no discharge current $i_c$ on the $V_{IN}$ side) while the other input of the comparator may be changing. In either setting, the VTC outputs a pulse signal to the TDC every time the comparison result changes.

The TDC is connected to an RO of a plurality of stages. In the example of FIG. 9, the RO has 16 stages L<0>, L<1>, . . . . L<15>, each of which is input to a D flip-flop of the TDC. Here the stages may be implemented using identical buffers connected in series to form a ring. Numbering these stages as 1-16 is merely for the convenience of illustration and does not indicate difference in significance among these stages. Note that the number of stages is not limiting, and some embodiments may have more or less than 16 stages.

The RO in FIG. 9 is a global RO. By "global," it means the RO is not exclusively connected to the TDC of a single ADC. Instead, the global RO is shared by and connected to a number of ADCs. For example, a global RO in the architecture of FIG. 1 may be shared by and connected to all of the ADCs #0 to #31. Therefore, although FIG. 3A shows that the RO 170 is part of the TD-ADC 150, the RO 170 may be a global RO that is also used by other TD-ADCs of the same architecture.

Using a global RO is advantageous over conventional techniques of using one RO per ADC. This is because the global RO drastically reduces the area occupied by the ADCs, thereby allowing the use of upsized gates/transistors (as shown in the dashed boxes in FIG. 9) and enabling the ADCs to have higher resolution and better pitch match without incurring significant noise or energy overhead.

Continuing with FIG. 9, the D flip-flops are clocked with the pulse input from the VTC and the outputs of the D flip-flops are fed to a decoder, such as the pseudo-thermal-to-binary converter. In the example of FIG. 9, there are 16 flip-flops in each TDC, and the pseudo-thermal-to-binary converter outputs a 4-bit signal, shown as DEC<3:0>, which is fed to a counter of the TDC. Here the decoder output DEC<3:0> and the counting output CNT <3:0> are for illustrative purpose only and should not limit the precision/resolution of the decoder and the counter in other embodiments. That is, the decoder output DEC and the counting output CNT may be signals with more or less than 4 bits in other embodiments.

Figure 10A:
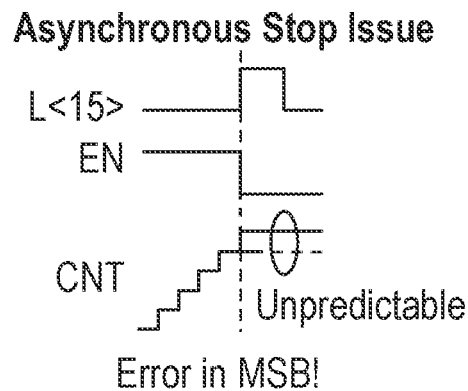
FIG. 10A shows a potential issue faced by conventional counters in TD-ADCs.

The counter is triggered by L<15> of the RO and is enabled by the pulse output from the VTC. Because the trigger and the enable/disable of the counter are not synchronized, there is potentially an issue when the two signals assert at the same time. This could lead to an unpredictable counting event and an error in the counting output CNT. FIG. 10A is an illustration of this issue.

Figure 10B:
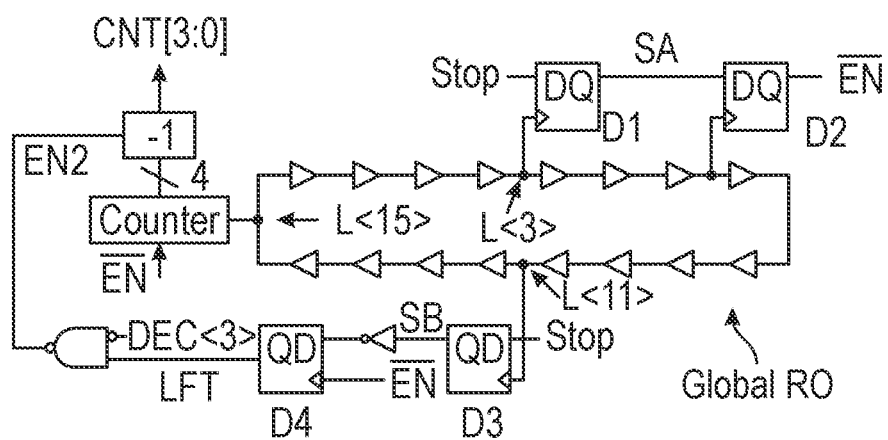
FIG. 10B shows the circuit of a counter with a safe stop mechanism according to one or more embodiments that could avoid the issue illustrated in FIG. 10A.
Figure 11:
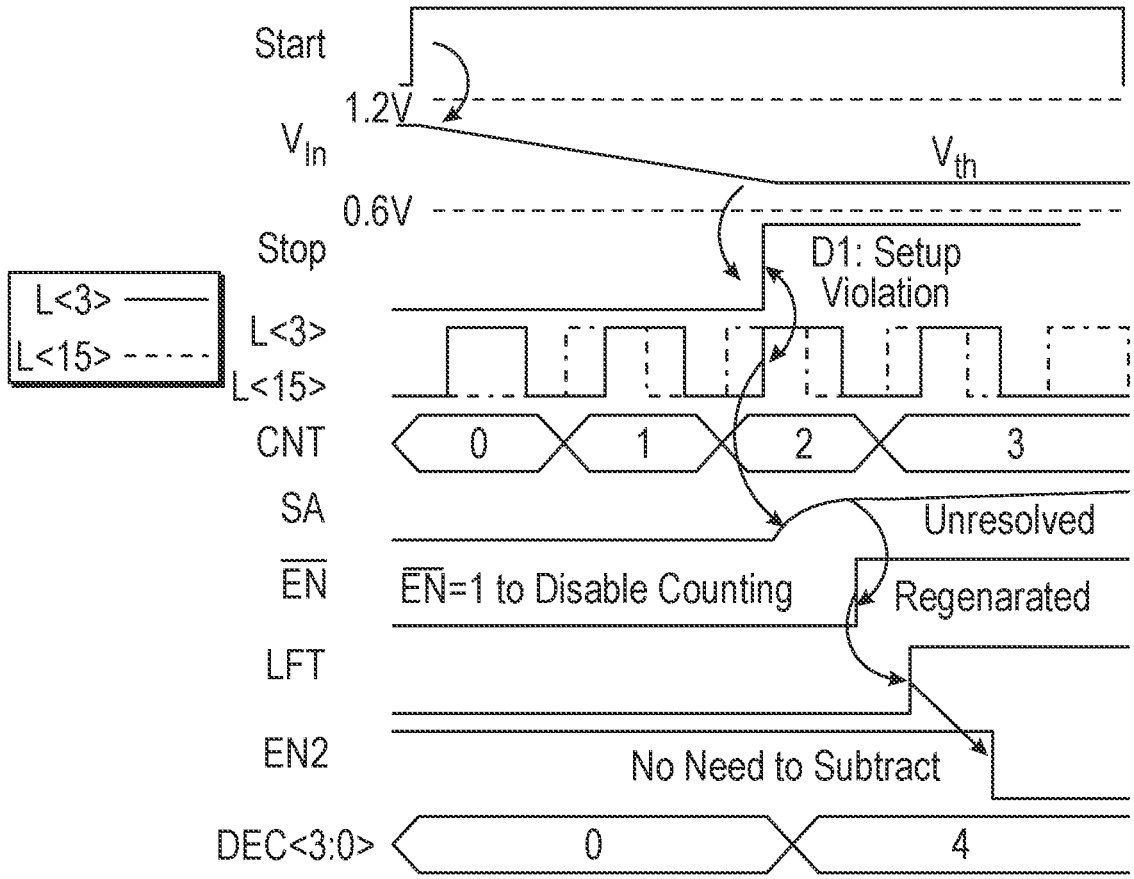
FIG. 11 shows the signal states and signal waveforms in accordance with the circuit of FIG. 10B.

To avoid this issue, the counter is designed to have a safe stop mechanism, in which the counter disable EN and the trigger L<15> are decoupled. An example of the safe stop mechanism is shown in FIG. 10B. In FIG. 10B, when the pulse is generated from the VTC and input to the counter as the "Stop" signal, EN does not assert immediately but is delayed by the D flip-flips D1 and D2 until L<3> of the RO switches. When "Stop" occurs, if the RO circulation is located in the right region (i.e., at 1 of the 8 buffers on the right hand side of the RO) or in the bottom left region (i.e., at 1 of the 4 buffers on the bottom left of the RO), then the counter is triggered once more and the final counting value needs to decrement by 1 to be correct. An example of the circuit for decrementing the counting value is shown in FIG. 10B, which generates an EN2 to the decrementor (the block marked by "−1"). The final counting output CNT is then generated from the decrementor. The values and waveforms of some relevant signals in the safe-stop mechanism are shown in FIG. 11 as an example. Note that the safe stop mechanism in FIGS. 10B and 11 uses L<3>, which has a distance of 4 stages (or 12 stages) from the counter trigger L<15>. However, this distance is not limiting. In the counter design of other embodiments, the safe stop mechanism may use a stage having a different distance from the counter triggering stage.

In one or more embodiments, the TD-ADC features a programmable precision for accurate and energy-efficient CNN inference. Here the term "precision" could be understood as the starting point, the gain, and the maximum digital code of the ADC transfer curve, as later shown in FIG. 13. To "program" the precision here means to tune circuit parameters by changing analog voltage/current or digital code without changing the circuit structure so as to achieve desired precision.

Figure 12A:
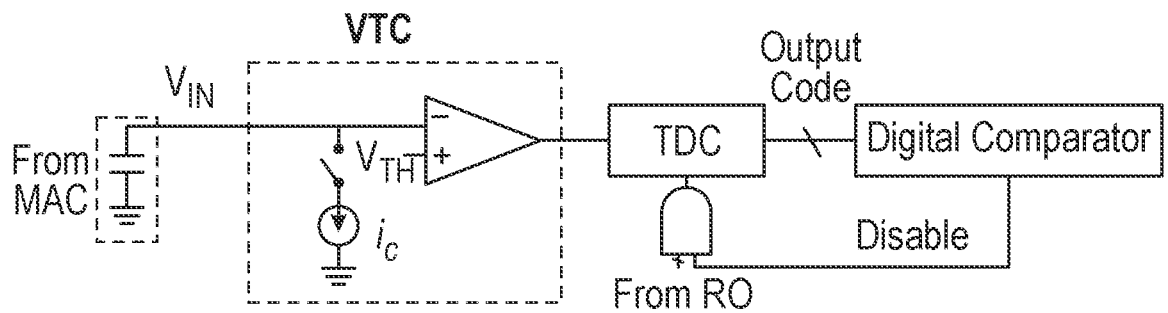
FIGS. 12A and 12B each show a circuit for achieving programmable precision in a TD-ADC according to one or more embodiments.
Figure 12B:
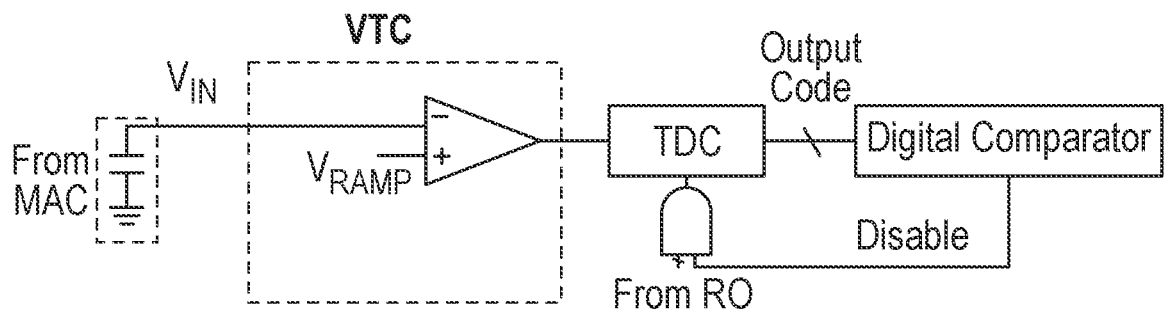

One or more embodiments achieve programmable precision using the circuit illustrated in FIGS. 12A and 12B. In both figures, the charge-domain IMC circuit further includes a digital comparator that compares the TDC output with a predetermined maximum code. When the TDC output exceeds the predetermined maximum code, the EN signal asserts so as to gate the RO stages fed into the TDC. This would stop the counting and sampling in the TDC and save energy. By changing the predetermined maximum code, the maximum digital code of the ADC transfer curve may be tuned.

Meanwhile, on the VTC side, the VTC compares the VTC input voltage $V_{IN}$ with a threshold voltage $V_{TH}$. This mechanism has been described earlier with reference to FIG. 9 and is further illustrated in FIG. 12A. The starting point of the transfer curve in this mechanism is tunable during MAC by changing $V_{IN}$, which corresponds to $V_{ST}$ as described earlier in reference to FIGS. 4A-8F. The gain of the transfer curve in this mechanism is tunable by changing the discharge current $i_c$, which is supplied by the current source.

As an alternative to the mechanism of FIG. 12A, the VTC input voltage $V_{IN}$ may be kept constant (i.e., no discharge current $i_c$ on the $V_{IN}$ side) while the other input of the comparator may be fed with a ramp signal $V_{RAMP}$, as illustrated in FIG. 12B. The starting point of the transfer curve in this mechanism thus is tunable either by tuning the VTC input voltage $V_{IN}$ or by tuning the starting voltage of the ramp signal $V_{RAMP}$. The gain of the transfer curve in this mechanism is tunable by changing the slope of the ramp signal $V_{RAMP}$. Here the ramp signal $V_{RAMP}$ may be "global," i.e., shared by all VTCs in the architecture. The basic concept of "ramp signal" is well-known in the art and thus is not repeated in this specification.

Figure 13:
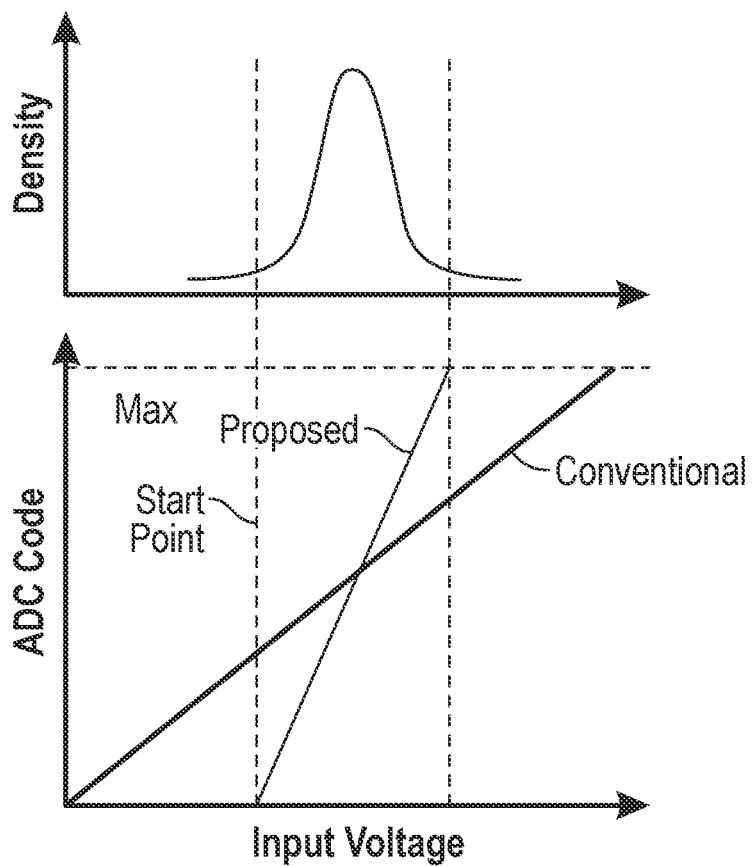
FIG. 13 illustrates the input voltage distribution and the transfer curve of the precision-programmable TD-ADC in comparison with those using conventional ADC designs.

FIG. 13 illustrates the input voltage distribution and the transfer curve of the precision-programmable TD-ADC according to one or more embodiments that adopt the circuit of FIG. 12A or FIG. 12B, in comparison with those using conventional ADC designs. According to Central Limit Theorem, the MAC computing results in practical neural networks and other machine learning models, i.e., input voltage of ADC, are centered around a certain point with a narrow spread. Thus, the conventional transfer curve that uniformly quantizes the voltage across the full input range may waste the quantization levels, leading to larger quantization errors and reduced machine learning model accuracy. Meanwhile, given the fact that certain neural network layers and models are less sensitive to quantization errors, it may be a waste of energy and time to always work in high-resolution mode.

In contrast to conventional techniques, embodiments that adopt the circuits of FIGS. 12A and 12B may clip the outliers and have a larger gain in a region where most inputs reside, i.e., the voltage region between the two vertical dashed lines in FIG. 13. The maximum code MAX is also tunable to save energy for accuracy-insensitive MACs.

Figure 14:
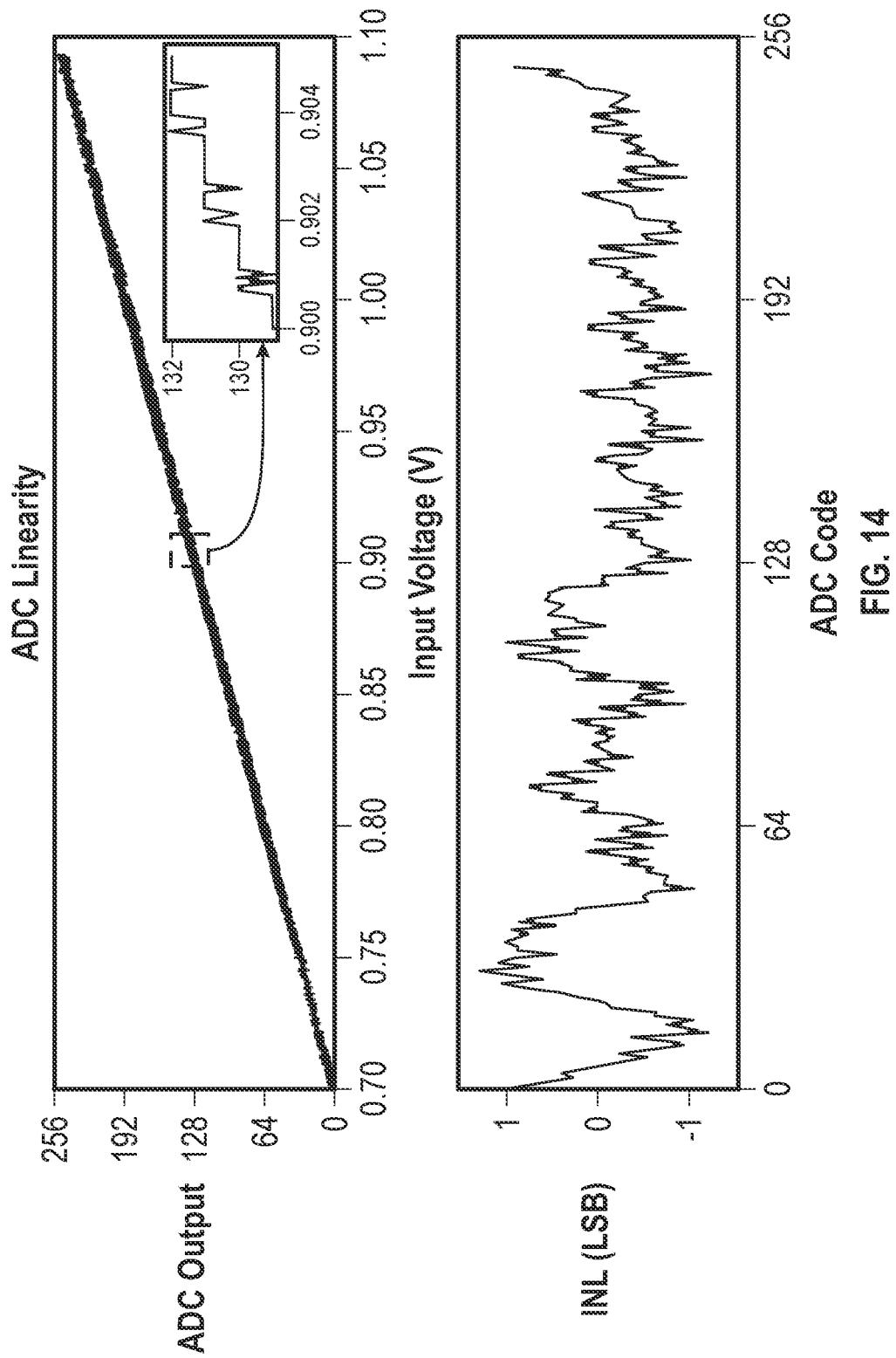
FIG. 14 shows test results obtained from a test chip using the TD-ADC according to one or more embodiments.
Figure 15:
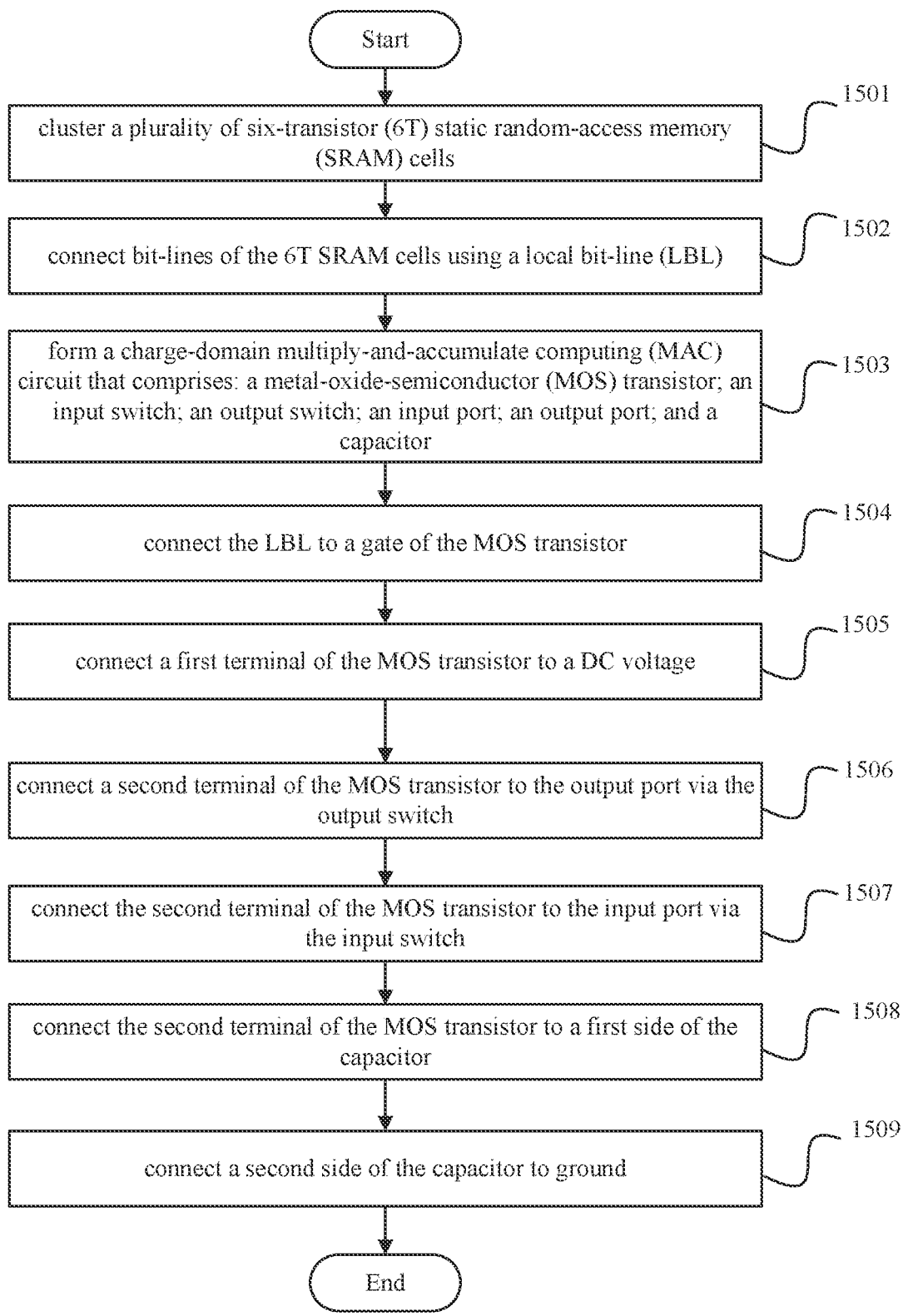
FIGS. 15-19 each show a flowchart that illustrates a method for charge-domain IMC according to one or more embodiments.
Figure 16:
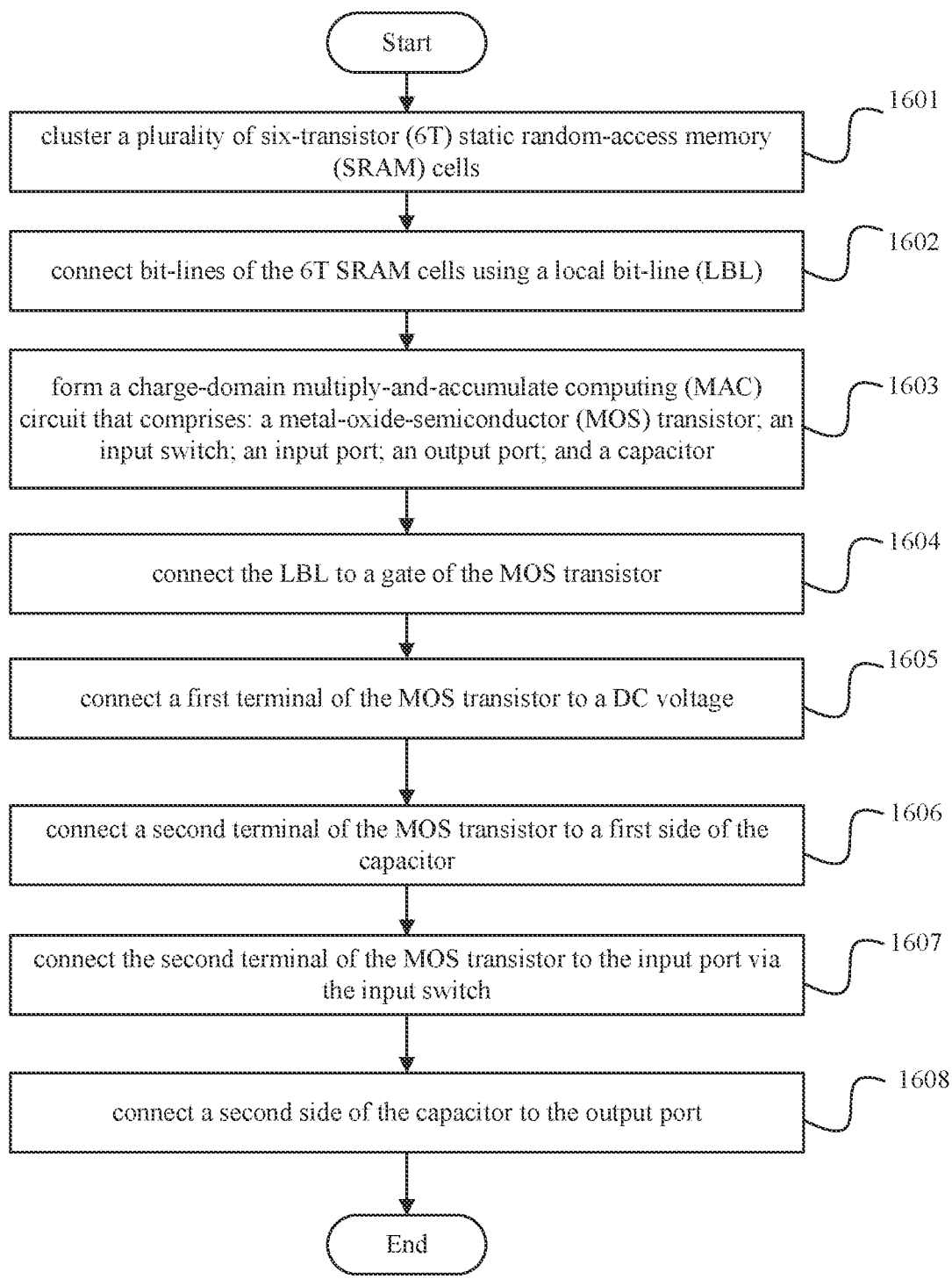
Figure 17:
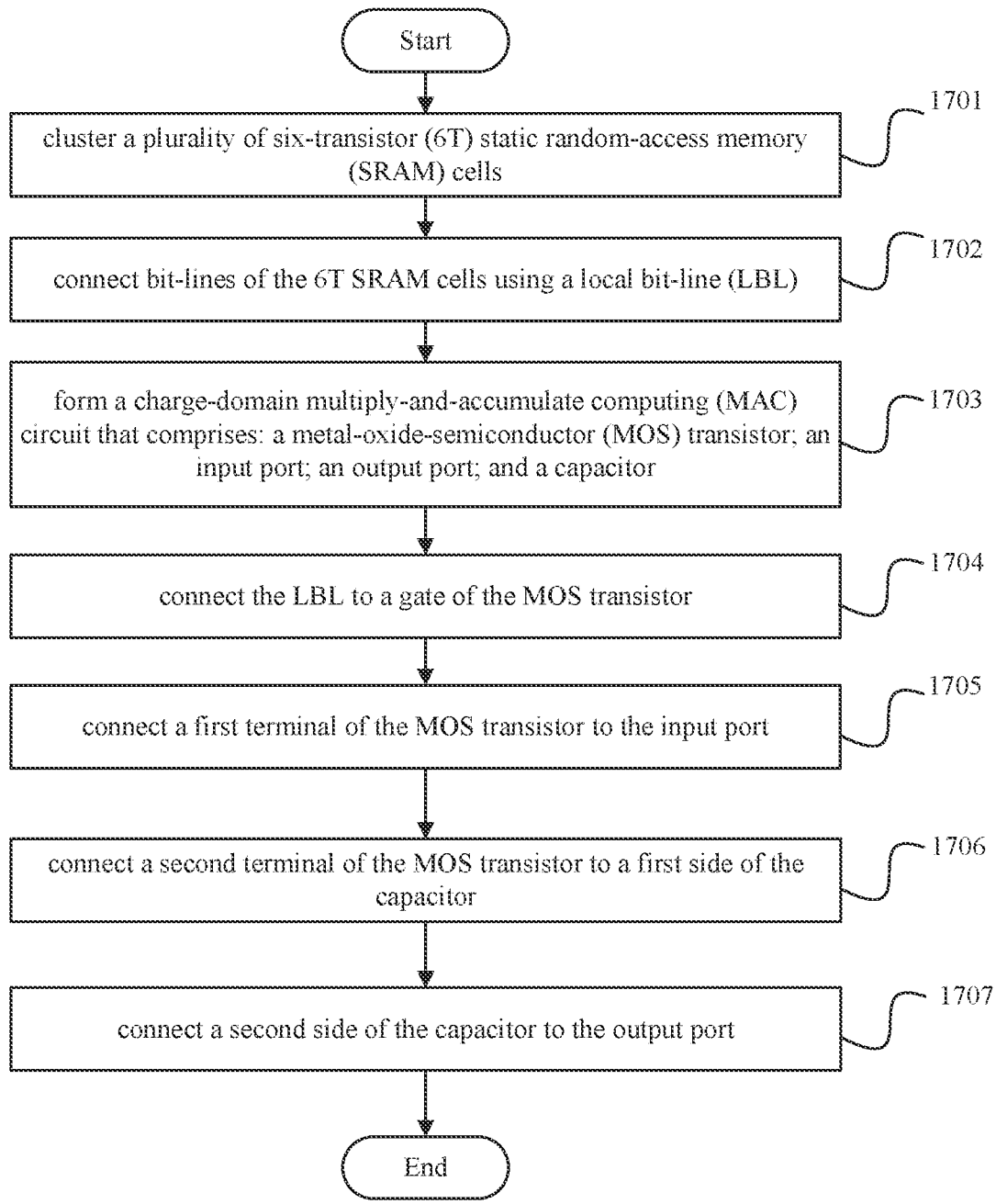
Figure 18:
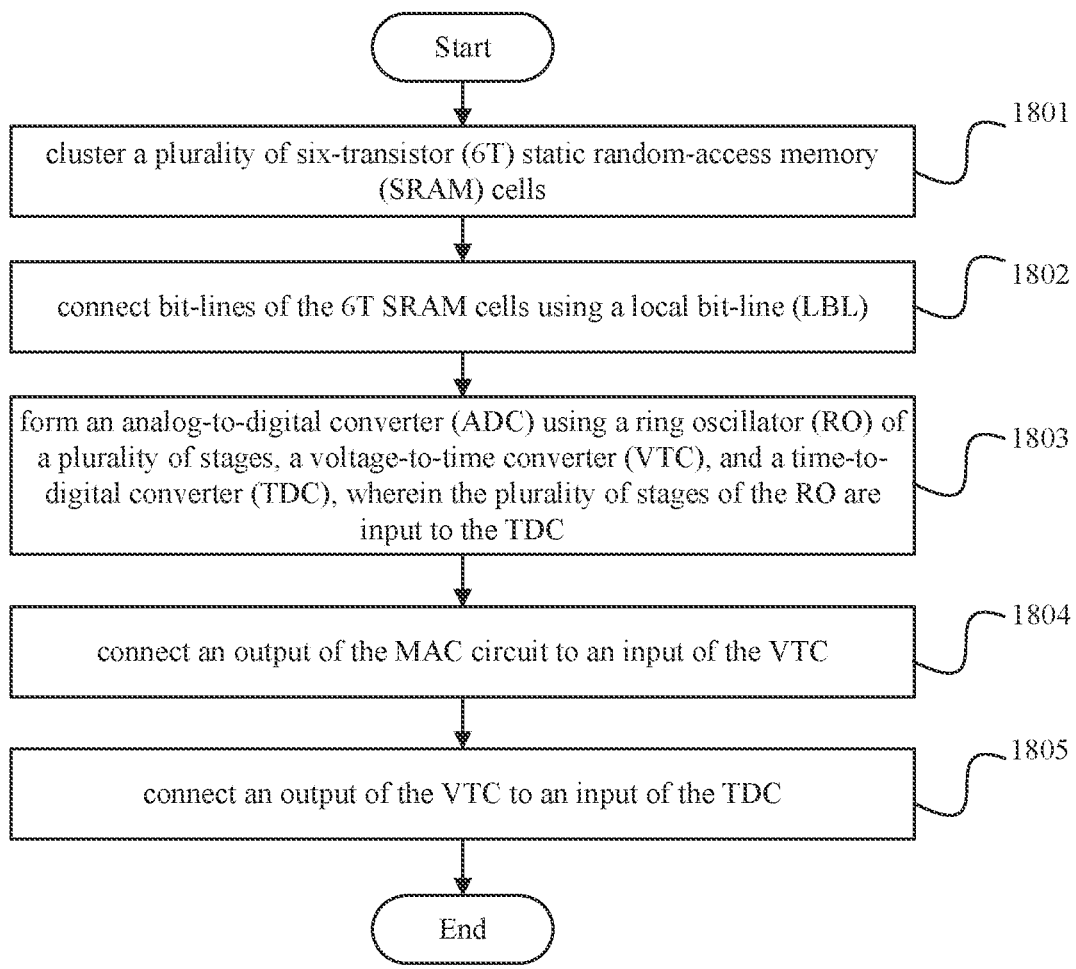
Figure 19:
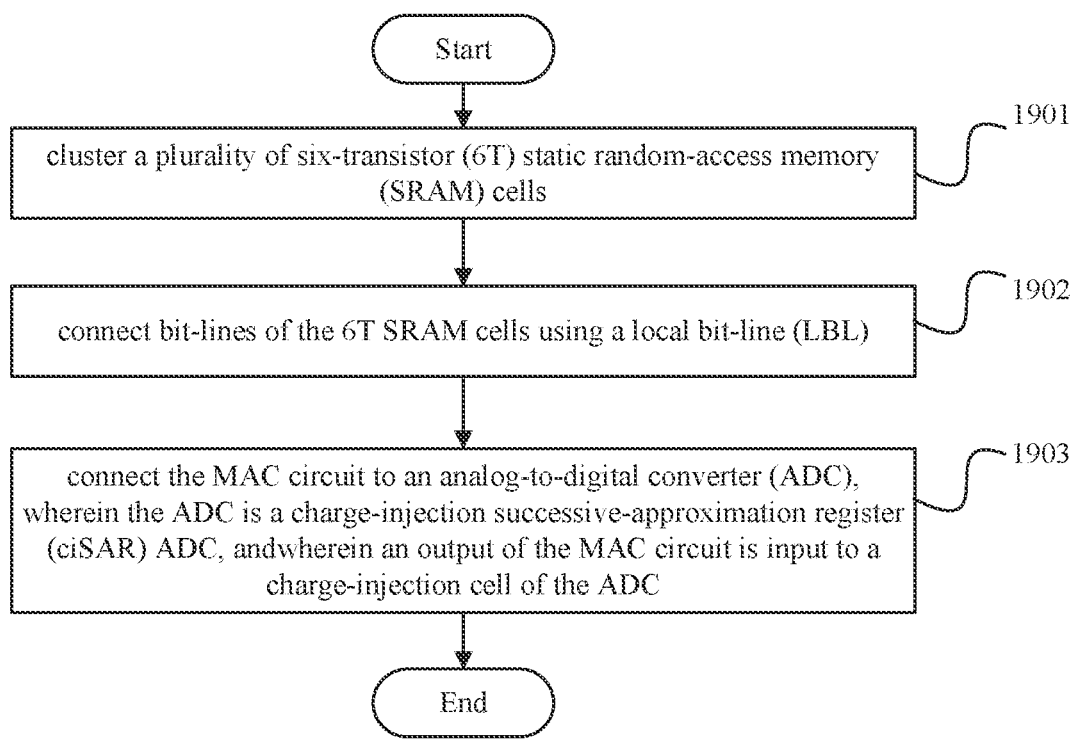

The aforementioned TD-ADC design has been demonstrated on a test chip with 65 nm CMOS process. The test chip demonstrates a pitch-matched 8-bit TD-ADC achieving −1.19/+1.24 integral nonlinearity (INL) and 0.57-bit random noise level without MSB errors, as shown in FIG. 14. The layout shows that the combined VTC-TDC circuitry has a dimension of about 63 μm×5 μm.

To summarize the above description of embodiments with the TD-ADC, for high compute-density, the area of the TD-ADC is small and the throughput is high in low- to moderate-resolution (≤9-bit) applications. For high energy efficiency, the TD-ADC does not need energy-hungry reference or input drivers. For precision programmability, this design significantly reduces quantization errors and enables adaptive CNN inference with mixed-precision. For scalability, the highly digital implementation makes the area and energy scale perfectly with advanced CMOS technology. For accuracy, the TD-ADC achieves great linearity with less layout matching issue compared with the conventional SAR ADCs and the IMC system shows only minor accuracy loss on widely-used compute-vision benchmarks.

Moreover, the disclosed cluster structure and computing scheme realize a constant input impedance (capacitive load) to the DAC for inputs. As a result, current-steering DACs without power-hungry analog buffers can be utilized for providing the multi-bit inputs of MAC. This design significantly reduces energy and area of the IMC macro (i.e., the conglomerate of IMC circuits within the architecture).

Although the above description focuses primarily on embodiments in the form of circuits, embodiments in the form of methods for making and using the circuits are also covered by this disclosure, as illustrated in the flowcharts of FIGS. 15-19. Note that the flowchart in each of the figures does not assume the steps are necessarily performed in a synchronous order. For example, in FIG. 15, steps 1506-1508 may be performed in the order as illustrated, in a different order, or in parallel.

From the description of the circuit embodiments, one of ordinary skill in the art would readily understand the steps for performing the methods, such as forming and connecting circuit components and inputting/outputting signals among the circuit components. Therefore, for the sake of brevity, this specification omits the description of the method steps corresponding to the circuit structures and operations.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A charge-domain in-memory computing (IMC) circuit comprising:
    a cluster of a plurality of six-transistor (6T) static random-access memory (SRAM) cells;
    a charge-domain multiply-and-accumulate computing (MAC) circuit; and
    a local bit-line (LBL),
    wherein the LBL is connected to a bit-line of each of the 6T SRAM cells,
    wherein the MAC circuit comprises: a metal-oxide-semiconductor (MOS) transistor; an input switch; an output switch; an input port; an output port; and a capacitor,
    wherein the LBL is connected to a gate of the MOS transistor,
    wherein a first terminal of the MOS transistor is connected to a DC voltage, and a second terminal of the MOS transistor is connected to the output port via the output switch,
    wherein the second terminal of the MOS transistor is connected to the input port via the input switch,
    wherein the second terminal of the MOS transistor is connected to a first side of the capacitor, and
    wherein a second side of the capacitor is grounded.

2. The IMC circuit according to claim 1, further comprising a reset switch and an output line, wherein the output line connects the reset switch to the output port.

3. The IMC circuit according to claim 2, wherein the output switch is electrically situated on the output line.

4. The IMC circuit according to claim 1, further comprising a pre-charge & read/write switch and a global bit-line (GBL),
    wherein the GBL is connected to the LBL via the pre-charge & read/write switch.

5. The IMC circuit according to claim 4, wherein the pre-charge & read/write switch comprises a p-channel MOS (PMOS) switch, an n-channel MOS (NMOS) switch, or a transmission gate (TG).

6. The IMC circuit according to claim 1,
    wherein the DC voltage is $V_{DD}$ and the MOS transistor is a p-channel MOS (PMOS) transistor, or
    wherein the DC voltage is ground and the MOS transistor is an n-channel MOS transistor (NMOS).

7. The IMC circuit according to claim 1,
    wherein the input switch comprises a p-channel MOS (PMOS) switch, an n-channel MOS (NMOS) switch, or a complementary MOS (CMOS) switch, and
    wherein the output switch comprises a PMOS switch, an NMOS switch, or a CMOS switch.

8. A charge-domain in-memory computing (IMC) circuit comprising:
    a cluster of a plurality of six-transistor (6T) static random-access memory (SRAM) cells;
    a charge-domain multiply-and-accumulate computing (MAC) circuit; and
    a local bit-line (LBL),
    wherein the LBL is connected to a bit-line of each of the 6T SRAM cells,
    wherein the MAC circuit comprises: a metal-oxide-semiconductor (MOS) transistor; an input switch; an input port; an output port; and capacitor,
    wherein the LBL is connected to a gate of the MOS transistor,
    wherein a first terminal of the MOS transistor is connected to a DC voltage, and a second terminal of the MOS transistor is connected to a first side of the capacitor,
    wherein the second terminal of the MOS transistor is connected to the input port via the input switch,
    wherein a second side of the capacitor is connected to the output port.

9. The IMC circuit according to claim 8, further comprising a reset switch and an output line,
    wherein the output line connects the reset switch to the output port.

10. The IMC circuit according to claim 8, further comprising a pre-charge & read/write switch and a global bit-line (GBL),
    wherein the GBL is connected to the LBL via the pre-charge & read/write switch.

11. The IMC circuit according to claim 10, wherein the pre-charge & read/write switch comprises a p-channel MOS (PMOS) switch, an n-channel MOS (NMOS) switch, or a transmission gate (TG).

12. The IMC circuit according to claim 8,
    wherein the DC voltage is $V_{DD}$,
    wherein the MOS transistor is a p-channel MOS (PMOS) transistor, and
    wherein the input switch comprises a PMOS switch.

13. The IMC circuit according to claim 8,
    wherein the DC voltage is ground,
    wherein the MOS transistor is an n-channel MOS (NMOS) transistor, and
    wherein the input switch comprises an NMOS switch.

14. A charge-domain in-memory computing (IMC) circuit comprising:
- a cluster of a plurality of six-transistor (6T) static random-access memory (SRAM) cells;
- a charge-domain multiply-and-accumulate computing (MAC) circuit; and
- a local bit-line (LBL),
- wherein the LBL is connected to a bit-line of each of the 6T SRAM cells,
- wherein the MAC circuit comprises: a metal-oxide-semiconductor (MOS) transistor; an input port; an output port; and a capacitor,
- wherein the LBL is connected to a gate of the MOS transistor,
- wherein a first terminal of the MOS transistor is connected to the input port, and a second terminal of the MOS transistor is connected to a first side of the capacitor,
- wherein a second side of the capacitor is connected to the output port.

15. The IMC circuit according to claim 14, further comprising a reset switch and an output line, wherein the output line connects the reset switch to the output port.

16. The IMC circuit according to claim 14, further comprising a pre-charge & read/write switch and a global bit-line (GBL),
- wherein the GBL is connected to the LBL via the pre-charge & read/write switch.

17. A method for charge-domain in-memory computing (IMC), comprising:
- clustering a plurality of six-transistor (6T) static random-access memory (SRAM) cells;
- connecting bit-lines of the 6T SRAM cells using a local bit-line (LBL);
- forming a charge-domain multiply-and-accumulate computing (MAC) circuit that comprises: a metal-oxide-semiconductor (MOS) transistor; an input switch; an output switch; an input port; an output port; and a capacitor;
- connecting the LBL to a gate of the MOS transistor;
- connecting a first terminal of the MOS transistor to a DC voltage;
- connecting a second terminal of the MOS transistor to the output port via the output switch;
- connecting the second terminal of the MOS transistor to the input port via the input switch;
- connecting the second terminal of the MOS transistor to a first side of the capacitor; and
- connecting a second side of the capacitor to ground.

18. A method for charge-domain in-memory computing (IMC), comprising:
- clustering a plurality of six-transistor (6T) static random-access memory (SRAM) cells;
- connecting bit-lines of the 6T SRAM cells using a local bit-line (LBL);
- forming a charge-domain multiply-and-accumulate computing (MAC) circuit that comprises: a metal-oxide-semiconductor (MOS) transistor; an input switch; an input port; an output port; and a capacitor;
- connecting the LBL to a gate of the MOS transistor;
- connecting a first terminal of the MOS transistor to a DC voltage;
- connecting a second terminal of the MOS transistor to a first side of the capacitor;
- connecting the second terminal of the MOS transistor to the input port via the input switch; and
- connecting a second side of the capacitor to the output port.

19. A method for charge-domain in-memory computing (IMC), comprising:
- clustering a plurality of six-transistor (6T) static random-access memory (SRAM) cells;
- connecting bit-lines of the 6T SRAM cells using a local bit-line (LBL);
- forming a charge-domain multiply-and-accumulate computing (MAC) circuit that comprises: a metal-oxide-semiconductor (MOS) transistor; an input port; an output port; and a capacitor;
- connecting the LBL to a gate of the MOS transistor;
- connecting a first terminal of the MOS transistor to the input port;
- connecting a second terminal of the MOS transistor to a first side of the capacitor; and
- connecting a second side of the capacitor to the output port.

\* \* \* \* \*